United States Patent [19]

Matsuura

[11] Patent Number: 5,023,620
[45] Date of Patent: Jun. 11, 1991

[54] CROSS-POLARIZATION INTERFERENCE CANCELLATION SYSTEM CAPABLE OF STABLY CARRYING OUT OPERATION

[75] Inventor: Toru Matsuura, Tokyo, Japan

[73] Assignee: NEC Corporation, Japan

[21] Appl. No.: 558,754

[22] Filed: Jul. 27, 1990

[30] Foreign Application Priority Data

Jul. 27, 1989 [JP] Japan ............................... 1-195515
Sep. 13, 1989 [JP] Japan ............................... 1-237450

[51] Int. Cl.$^5$ .................... H01Q 21/06; H01Q 21/24
[52] U.S. Cl. .................................. 342/362; 375/102
[58] Field of Search ............... 342/361, 362; 375/102

[56] References Cited

U.S. PATENT DOCUMENTS

4,575,862 3/1986 Tahara et al. ...................... 375/102
4,757,319 7/1988 Lankl .................................. 375/102

*Primary Examiner*—Theodore M. Blum
*Attorney, Agent, or Firm*—Laff, Whitesel, Conte & Saret

[57] ABSTRACT

In a cross-polarization interference cancellation system operable in response to desired and undesired or interference source signals which are obtained from polarized waves having planes of polarization orthogonal to each other and which are produced in accordance with clock signals having a predetermined clock frequency, an interference signal is included in the desired signal and is derived from the interference source signal to be removed from the desired signal by the use of an interference canceller and to be produced as an interference free signal. The interference free signal is demodulated into demodulated signals, error signals, and quadrant detection signals by a demodulator unit. In this event, the quadrant detection signals alone are stably demodulated by the use of specific clock signals which are sent through a frequency doubler operable to double the predetermined clock frequency of the clock signals. The interference canceller comprises a transversal filter and a control signal generator for supplying the transversal filter with control signals stably produced by the control signal generator. As a result, the interference canceller is stably operated in response to the control signals.

14 Claims, 17 Drawing Sheets

FIG.15

CROSS-POLARIZATION INTERFERENCE CANCELLATION SYSTEM CAPABLE OF STABLY CARRYING OUT OPERATION

BACKGROUND OF THE INVENTION

This invention relates to a cross-polarization interference cancellation system for use in a microwave digital radio communication network which carries out communication by the use of polarized waves having planes of polarization orthogonal to each other.

Recent attention has been directed to an orthogonal polarization digital radio communication network which carries out communication through a transmission medium by the use of a pair of polarized waves which are orthogonal to each other and which may be, for example, either a pair of a vertical polarized wave and a horizontal polarized wave or a pair of a right-handed polarized wave and a left-handed polarized wave. At any rate, it is possible in such an orthogonal polarization digital radio communication network to effectively utilize frequencies necessary for transmission of information signals because the polarized waves of the same frequency are individually used to transmit the information signals different from each other. Herein, each of the information signals is assumed to be produced at a predetermined transmission rate.

In such an orthogonal polarization digital radio communication network, cross-polarization interference often takes place between the polarized waves, for example, from the vertical polarized wave to the horizontal polarized wave due to that anisotropy of the transmission medium which might result from rain or the like.

A conventional cross-polarization interference cancellation system has been proposed so as to cancel such cross-polarization interference and basically comprises a cross-polarization interference cancellation circuit and a demodulator circuit. More specifically, the cross-polarization interference cancellation circuit is supplied with first and second input signals which stem from polarized radio waves having planes of polarization orthogonal to each other and which may be, for example, intermediate frequency signals. In this event, each of the first and the second input signals might be subjected to cross-polarization interference and might therefore include interference components due to the cross-polarization interference, respectively. In order to cancel such interference components, the cross-polarization interference cancellation circuit comprises first and second cancellation units which are operable to cancel the interference components included in the first and the second input signals, respectively, and which are similar in structure and operation to each other. Each of the first and the second cancellation units comprises a delay circuit for delaying each of the first and the second input signals to produce a delayed input signal, a transversal filter circuit for reproducing the interference component included in the other input signal to subtract the interference component from the delayed input signal to produce an interference free signal, and a control signal generator for generating a plurality of control signals to deliver the control signals to the transversal filter circuit. The transversal filter circuit comprises a plurality of delay units each of which has a delay time equal to the transmission rate.

On the other hand, the demodulator circuit comprises first and second demodulators supplied with the interference free signals from the first and the second cancellation units to demodulate the interference free signals into demodulated signals. The demodulated signals fall within a selected one of first through fourth quadrants when they are represented on a phase plane. In addition to the demodulated signals, each of the first and the second demodulators also produces a set of error signals and quadrant detection signals representative of the selected quadrant.

It is to be noted that each of the error signals and the quadrant detection signals are detected by the use of a clock pulse which has a clock frequency equal to the transmission rate.

With this structure, each of the delay units in the transversal filter circuit is operable at the clock pulse of the clock period sent from the other cancellation unit. In addition, the error signals and the quadrant detection signals are also detected by the clock pulse.

Accordingly, when a time difference of T/2 exists between the interference component and each input signal from which the interference component is cancelled, an ability of the cross-polarization interference cancellation is seriously reduced.

Alternatively, another conventional cross-polarization interference cancellation system is disclosed in an article which is contributed by B. Lankl et al to 1988 IEEE, pp. 1355–1361, and which is entitled "Cross-polarization interference in the presence of delay effects". With this structure, the error signals are discriminated and reproduced after coherent detection by the use of a clock pulse which has a clock frequency equal to twice the transmission rate. This shows that the error signals are extracted at transition points, although the quadrant signal is reproduced by a clock pulse having a clock frequency equal to the transmission rate. Such extraction of the error signals at the transition points objectionably raises a probability of extracting an erroneous information signal and brings about instability of operation.

SUMMARY OF THE INVENTION

It is an object of this invention to provide a cross-polarization interference cancellation system which can stabilize an operation.

It is another object of this invention to provide a cross-polarization interference cancellation system of the type described, which can stably derive control signals from an input signal.

A cross-polarization interference cancellation system to which this invention is applicable is for use in cancelling a cross-polarization interference which occurs during transmission of first and second polarized waves having planes of polarization orthogonal to each other. The cross-polarization interference cancellation system is supplied with first and second input signals which result from the first and the second polarized waves, respectively, and comprises an interference canceller supplied with the first and the second input signals for cancelling the cross-polarization interference included in the first and the second input signals to produce first and second interference free signals, respectively, and a demodulating circuit coupled to the interference canceller for demodulating the first and the second interference free signals into first and second demodulated signals together with first and second sets of error signals and first and second sets of quadrant detection signals, respectively. The first and the second sets of the quadrant detection signals are representative of quadrants of the first and the second demodulated signals, respectively, when the first and the second demodulated signals are represented on a phase plane. The demodulating circuit comprises first and second coherent detecting means supplied with the first and the second interference free signals for carrying out coherent detection of the first and the second interference free signals to produce first and second sets of detected signals, respectively, first and second clock production means for producing first and second clock signals each of which has a clock frequency. First and second analog/digital converter means are supplied with the first and the second sets of the detected signals and with the first and the second clock signals to convert the first and the second sets of the detected signals into first and second detected digital signals, respectively. The system further comprises first frequency doubler means supplied with a selected one of the first and the second clock signals for doubling the clock frequency of the selected one of the first and the second clock signals to produce a first specific clock signal having twice the clock frequency of the selected one of the first and the second clock signals, second frequency doubler means supplied with a remaining one of the first and the second clock signals for doubling the clock frequency of the remaining one of the first and the second clock signals to produce a second specific clock signal having twice the clock frequency of the remaining one of the first and the second clock signals, first quadrant detection means for detecting the quadrant of a selected one of the first and the second sets of detected signals in response to a selected one of the first and the second specific clock signals and the selected one of the first and the second sets of the detected signals, and a second quadrant detection means for detecting the quadrant of a remaining one of the first and the second sets of detected signals in response to a remaining one of the first and the second specific clock signals and the remaining one of the first and the second sets of the detected signals.

BRIEF DESCRIPTION OF THE DRAWING

FIG. 15 is a time chart for use in describing operation of the cross-polarization interference cancellation system illustrated in FIG. 10;

DESCRIPTION OF THE PREFERRED EMBODIMENTS

Figure 1:
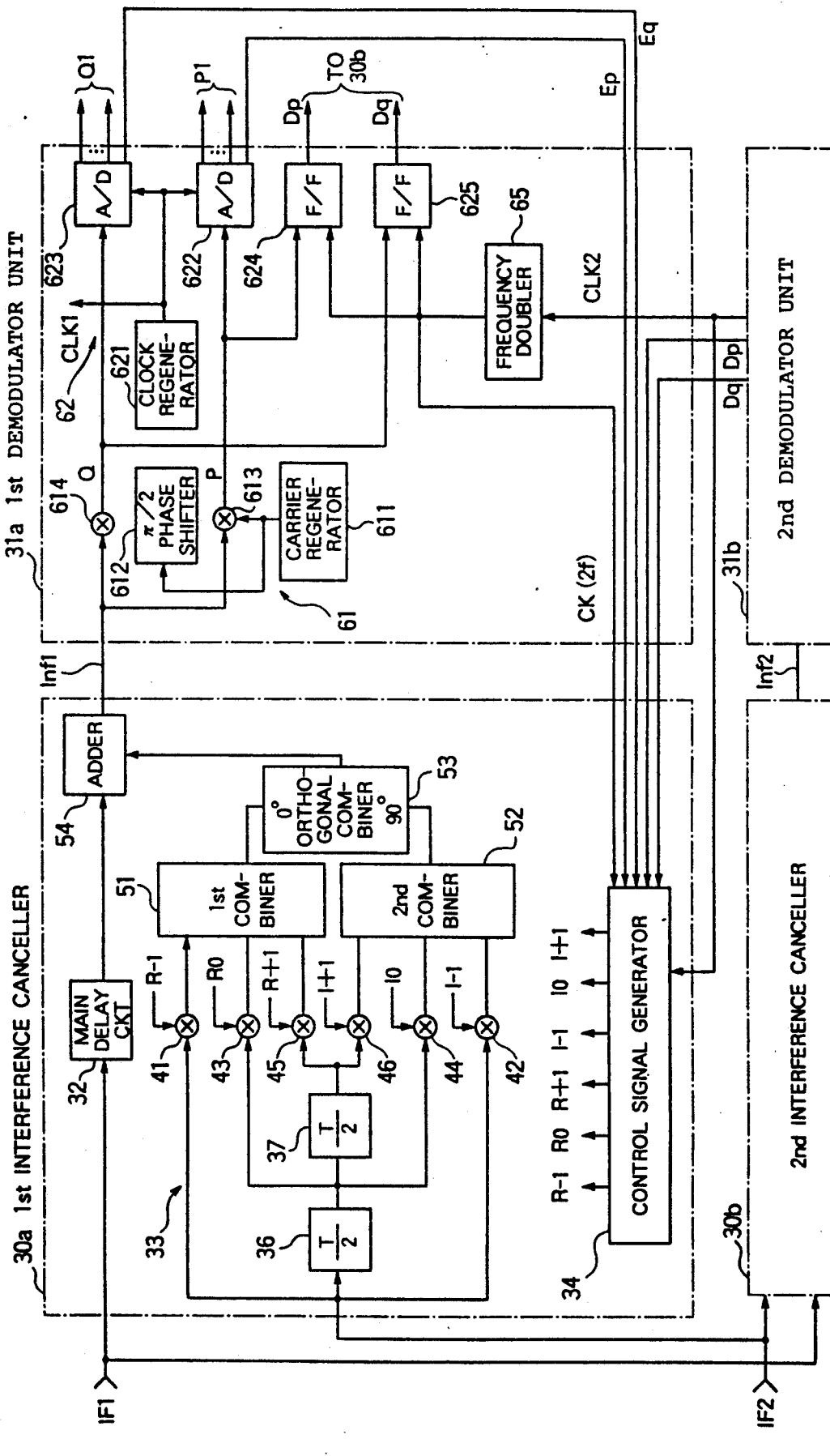
FIG. 1 is a block diagram of a cross-polarization interference cancellation system according to a first embodiment of this invention.

Referring to FIG. 1, a cross-polarization interference cancellation system according to a first embodiment of this invention is operable in response to first and second input signals IF1 and IF2 each of which has an intermediate frequency band and which result from a pair of polarized waves having planes of polarization orthogonal to each other. Each of the polarized waves is individually subjected to modulation and carries information signals which is represented by a plurality of bits arranged from a most significant bit to a least significant bit and each of which is representative of a symbol produced at a symbol period (T). The symbol period T may be considered as a clock period of a clock pulse because the clock pulse generated in the system is the same as the symbol period. The clock period T is equal to a reciprocal of a clock frequency. In this connection, it may be considered that the first and the second input signals IF1 and IF2 carry a first set of the information signals and a second set of the information signals, respectively. Each most significant bit of the information signals of each set may be referred to as a quadrant detection signal because it serves to discriminate a quadrant of each information signal when the information signals are represented on a phase plane.

In addition, the first and the second input signals IF1 and IF2 might be subjected to cross-polarization interference which results from the other input signals, respectively, and include first and second interference components, respectively. The illustrated cross-polarization interference cancellation system is operable to cancel the first and the second interference components.

More particularly, the illustrated cross-polarization interference cancellation system comprises first and second interference cancellers 30a and 30b supplied with the first and the second input signals IF1 and IF2 to produce first and second interference free signals Inf1 and Inf2 and first and second demodulator units 31a and 31b operable in response to the first and the second interference free signals Inf1 and Inf2 in a manner to be described later in detail. The first and the second interference cancellers 30a and 30b are similar in structure and operation to each other and may be collectively called a cross-polarization interference cancellation circuit while the first and the second demodulator units 31a and 31b are similar in structure and operation to each other and may be collectively called a demodulator circuit.

In FIG. 1, description will be mainly restricted to the first interference canceller 30a and the first demodulator unit 31a hereinunder with description omitted about the second interference canceller 30b and the second demodulator unit 31b. In this connection, the first input signal IF1 may be referred to as a desired input signal while the second input signal IF2 may be referred to as an interference source signal. The first input signal IF1 is supplied to the first interference canceller 30a on one hand and to the second interference canceller 30b on the other hand. Likewise, the second input signal IF2 is also supplied to both the second and the first interference cancellers 30b and 30a.

The first interference canceller 30a comprises a main delay circuit 32 for delaying the first input signal IF1, a transversal filter 33 of a fractional spacing type, and a control signal generator 34 for delivering various kinds of control signals to the transversal filter 33 in a manner to be described.

Herein, the illustrated transversal filter 33 comprises first and second delay units 36 and 37 which have an input tap and an output tap, respectively, and which are connected to each other through a center tap and each of which has a delay time equal to a half of the symbol period, namely, the clock period T. Therefore, the delay time may be represented by T/2, as illustrated in FIG. 1. The second input signal IF2 is supplied to the input tap of the transversal filter 33 to be delivered to the first delay unit 36 and first and second weighting circuits 41 and 42 which are supplied from the control signal generator 34 with first and second ones of the control signals that are depicted at R−1 and I−1, respectively, wherein R and I specify the control signals for controlling real and imaginary parts, respectively, and −1 is representative of a time difference between the first and the center taps. The center tap of the transversal filter 33 is connected to third and fourth weighting circuits 43 and 44 controlled by third and fourth ones of the control signals that are supplied from the control signal generator 34 and that are depicted at R0 and I0, respectively. On the other hand, the output tap is connected to fifth and sixth weighting circuits 45 and 46 controlled by fifth and sixth ones of the control signals that are depicted at R+1 and I+1, respectively.

In any event, the first through the sixth weighting circuits 41 to 46 produce first through sixth weighted signals determined by the first through the sixth control signals R−1 to I+1, respectively. The first, the third, and the fifth weighted signals are sent to a first combiner 51 to be produced as a first combined signal while the second, the fourth, and the sixth weighted signals are sent to a second combiner 52 to be produced as a second combined signal. The first and the second combined signals are combined into a third combined signal by an orthogonal combiner 53 with a phase difference kept at 90. The third combined signal is representative of a reproduction of the second interference component and is sent to an adder 54 to be subtracted from a first delayed input signal. As a result, the first interference free signal Inf1 is supplied from the first interference canceller 30a to the first demodulator unit 31a.

Although not illustrated in FIG. 1, the second interference signal Inf2 is also delivered from the first interference canceller 30b to the second demodulator unit 31b like in the above-mentioned manner.

The first demodulator unit 31a comprises a coherent detector 61 supplied with the first interference free signal Inf1 of the intermediate frequency which is subjected to the modulation like the first input signal IF1. The coherent detector 61 carries out coherent detection of the first interference free signal Inf1 to produce a pair of detected signals P and Q. Specifically, the coherent detector 61 comprises a carrier regenerator 611 for regenerating a carrier wave and a $\pi/2$ phase shifter 612 for shifting a phase of the carrier wave by $\pi/2$ to produce a phase shifted carrier wave. The carrier wave is supplied to a first multiplier 613 to be multiplied by the first interference free signal Inf1 while the phase shifted carrier wave is supplied to a second multiplier 614 and is also multiplied by the first interference free signal Inf1. As a result, the first multiplier 613 produces a primary one P of the detected signals that falls within a baseband frequency region while the second multiplier 614 produces a subsidiary one Q of the detected signals.

The second demodulator unit 31b also comprises a coherent detector identical with the illustrated coherent detector 61. In this connection, the coherent detectors in the first and the second demodulator units 31a and 31b may be called first and second coherent detectors, respectively.

In the first demodulator unit 31a, the primary and the subsidiary detected signals P and Q are sent to a reproduction circuit 62. As shown in FIG. 1, the reproduction circuit 62 comprises a clock regenerator 621 for regenerating a sequence of clock pulses which has a clock period equal to the symbol period carried by the first input signal IF1 and which may be called a sequence of regenerated clock pulses CLK which may be also called first clock pulses or signals. The regenerated clock pulses CLK1 are delivered to first and second analog-to-digital converters 622 and 623 which are supplied with the primary and the subsidiary detected signals P and Q and which are operable to demodulate the primary and the subsidiary detected signals P and Q into primary and subsidiary sets P1 and Q1 of demodulated signals together with first and second error signals Ep and Eq. Therefore, the first and the second analog-to-digital converters 622 and 623 of the first demodulator unit 31a may be referred to as a demodulator circuit. It is to be noted that the regenerated clock pulses CLK1 are sent to the second demodulator unit 31b, as will become clear as the description proceeds.

The demodulated signals of each of the primary and the subsidiary sets P1 and Q1 are composed of a predetermined number of bits arranged from a most significant bit to a least significant bit while each of the first and the second error signals Ep and Eq is specified by an additional bit following the least significant bit. The primary and the subsidiary sets P1 and Q1 of the demodulated signals will be named a first demodulated signal in consideration of a second demodulated signal produced by the second demodulator unit 31b.

Furthermore, the reproduction circuit 62 comprises first and second flip-flops 624 and 625 which are supplied with the primary and the subsidiary sets P1 and Q1 of the demodulated signals and which detect quadrants of the primary and the subsidiary sets P1 and Q1 of the demodulated signals to produce primary and subsidiary quadrant detection signals Dp and Dq, respectively. Therefore, the first and the second flip-flops 624 and 625 may be referred to as a quadrant detection circuit.

It is noted that the primary and the subsidiary flip-flops 624 and 625 are operated in cooperation with a frequency doubler (a frequency multiplier of a factor 2) 65 supplied with a sequence of regenerated clock pulses CLK2 which is sent from the second demodulator unit 31b and which may be called second clock pulses or signals. The frequency doubler 65 serves to double a frequency of the second clock pulses CLK2 and to produce a sequence of specific clock pulses CK which has a clock frequency equal to twice the clock frequency of the second clock pulses CLK2. Namely, the specific clock pulses CK have a double clock frequency in comparison with the clock pulses CLK2. In other words, the specific clock pulses CK have a clock period equal to a half of the clock period T of the second clock pulses CLK2. Consequently, the primary and the subsidiary flip-flops 624 and 625 produce the primary and the subsidiary quadrant detection signals Dp and Dq in accordance with the specific clock pulses CK of the double clock frequency.

The primary and the subsidiary quadrant detection signals Dp and Dq are identical with the most significant bits of the primary and the subsidiary sets P1 and Q1 of the demodulated signals and can therefore be reproduced even when each set of the demodulated signals is not wholly reproduced at every one of the specific clock pulses, differing from the first and the second error signals Ep and Eq which are produced only on a complete reproduction of each set of the demodulated signals. This shows that the primary and the subsidiary quadrant detection signals Dp and Dq are stably extracted from the detected signals P and Q even at each transition point appearing at an intermediate time instant between the clock period T without any quantization error and without waste of power consumption. Accordingly, the primary and the subsidiary quadrant detection signals Dp and Dq are stably and accurately derived from the primary and the subsidiary sets P1 and Q1 of the demodulated signals and sent to that control signal generator of the second interference canceller 30b which is similar to that of the first interference canceller 31a. In this connection, the latter may be called a first control signal generator while the former, a second control signal generator. In addition, inasmuch as the quadrant detection circuit may be implemented by flip-flops which is operable in response to a high clock pulse, it is possible to widen a frequency tolerance as regards a clock frequency and to make the quadrant detection circuit small in size.

As illustrated in FIG. 1, the control signal generator of the first interference canceller 30a is supplied with the specific clock pulses CK and the first and the second error signals Ep and Eq from the first demodulator unit 31a and with the primary and the subsidiary quadrant detection signals Dp and Dq from the second demodulator unit 31b.

Figure 2:
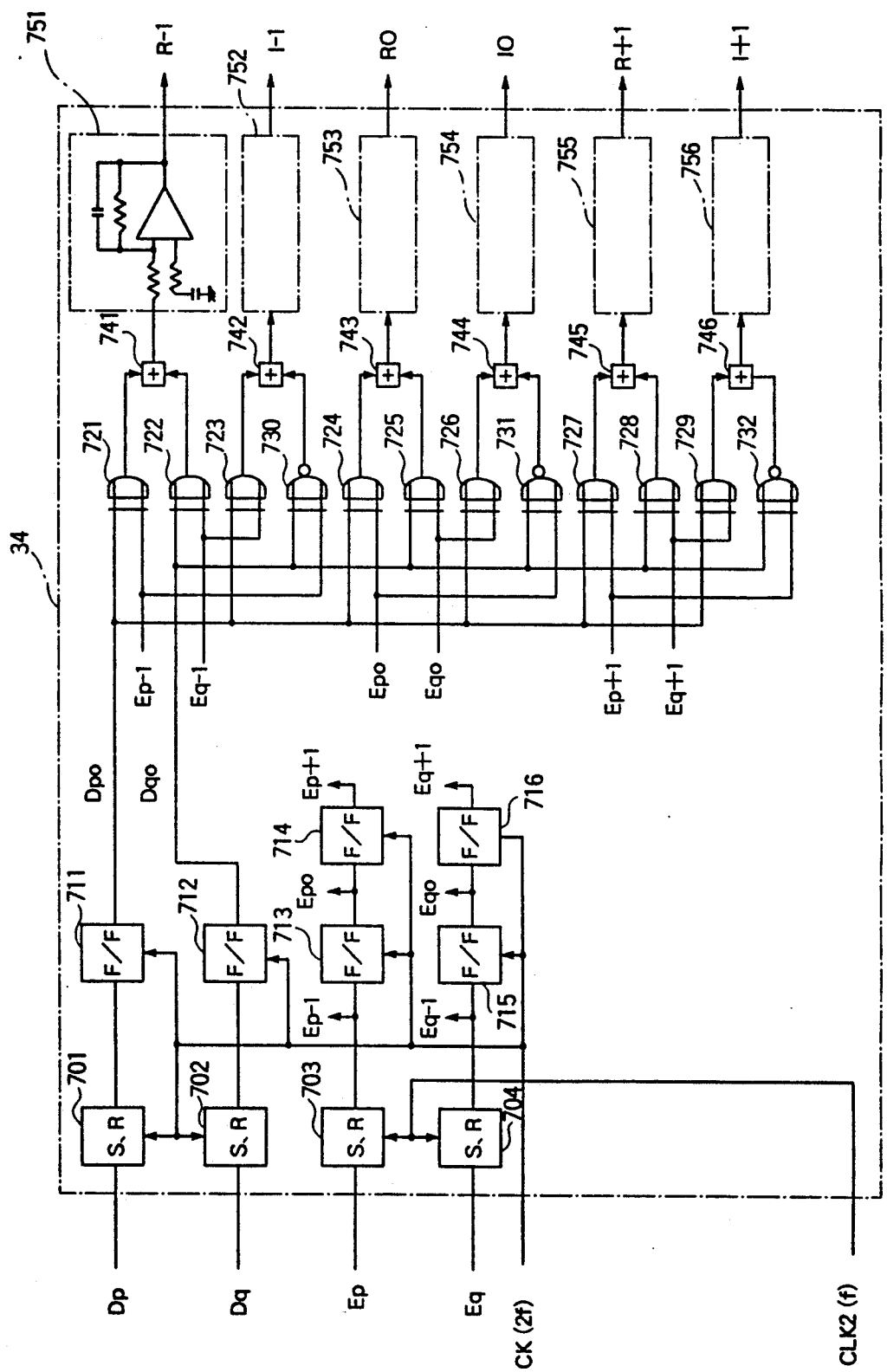
FIG. 2 is a block diagram of a control signal generator available for the system illustrated in FIG. 1.

Referring to FIG. 2, a control signal generator 34 is available as each of the first and the second signal generators included in the first and the second interference cancellers 30a and 30b illustrated in FIG. 1 and is assumed to be used as the first interference canceller 30a. In the illustrated example, the primary and the subsidiary quadrant detection signals Dp and Dq are sent from the second demodulator unit 31b (FIG. 1) to the control signal generator 34 of the first interference canceller 30a. The primary and the subsidiary quadrant detection signals Dp and Dq are stored in first and second shift registers (SR) 701 and 702 in synchronism with the specific clock pulses CK of the specific or double clock frequency (2f) and produced as first and second quadrant signals. In addition, the first and the second error signals Ep and Eq are sent from the first and the second analog-to-digital converters 622 and 623 of the first demodulator unit 31a to third and fourth shift registers (SR) 703 and 704 which are operable in response to the second clock pulses CLK2 sent from the second demodulator unit 31b (FIG. 1). Consequently, the first and the second error signals Ep and Eq are stored in the third and the fourth shift registers 703 and 704 in synchronism with the second clock pulses CLK2 to be produced as first and second output error signals.

At any rate, the first through the fourth shift registers 701 to 704 serve to adjust a time difference between the first and the second quadrant signals and the first and the second output error signals. In this connection, the first and the second quadrant signals and the first and the second output error signals may be called adjusted quadrant signals and adjusted error signals.

On the other hand, the primary and the subsidiary quadrant detection signals Dp and Dq are kept in first and second flip-flops 711 and 712 timed by the specific clock pulses CK of the specific clock frequency (2f). The first and the second flip-flops 711 and 712 produce primary and subsidiary retimed quadrant signals Dp0 and Dq0, respectively, where 0 is representative of a current time instant.

The first output error signal is sent from the third shift register 703 to a series connection of third and fourth flip-flops 713 and 714 which are operable in response to the specific clock pulses CK of the specific clock frequency (2f) to produce a preceding error signal Ep+1, a current error signal Ep0, and a following error signal Ep−1 which appear at preceding, current, and following time instants, respectively. The preceding and the following time instants are delayed and succeeded relative to the current time instant and may therefore be called delayed and following time instants symbolized at a plus sign + and a minus sign −, respectively. Specifically, the delayed and the following time instants represented by +1 and −1 are located before and after the current time instant by a half of the clock period T of the second clock pulses CLK2.

Likewise, the second output error signal is sent from the fourth shift register 704 to a series connection of fifth and sixth flip-flops 715 and 716 which are timed by the specific clock pulses CK to produce preceding, current, and following error signals Eq+1, Eq0, and Eq−1 synchronized with Ep+1, Ep0, and Ep−1, respectively.

The primary and the subsidiary retimed quadrant signals Dp0 and Dq0 and the above-mentioned error signals Ep+1, Ep0, Ep−1, Eq+1, Eq0, and Eq−1 are sent to first through ninth Exclusive OR circuits 721 to 729 and first through third Exclusive NOR circuits 730 to 732 so as to detect correlations among the primary and the subsidiary retimed quadrant signals Dp0 and Dq0 and the error signals Ep+1, Ep0, Ep−1, Eq+1, Eq0, and Eq−1. The Exclusive OR circuits 721 to 729 and the Exclusive NOR circuits 730 to 732 are connected to one another in a manner known in the art and will not be described any longer. At any rate, a combination of such Exclusive OR circuits and Exclusive NOR circuits produces correlation signals representative of the correlations among the primary and the subsidiary quadrant detection signals Dp and Dq and the error signals Ep+1, Ep0, Ep−1, Eq+1, Eq0, and Eq−1.

The correlation signals are delivered to first through sixth adders 741 to 746 each of which add a pair of the correlation signals to each other. Results of addition are sent to first through sixth integrators 751 to 756 to be produced therefrom as the control signals R0, R+1, R−1, I0, I+1, and I−1.

The above-mentioned control signals R0, R+1, R−1, I0, I+1, and I−1 are delivered to the first through the sixth weighting circuits 41 to 46 (FIG. 1) and are effective to minimize the interference component which is included in the first input signal IF1 due to cross-polarization interference.

Figure 3:
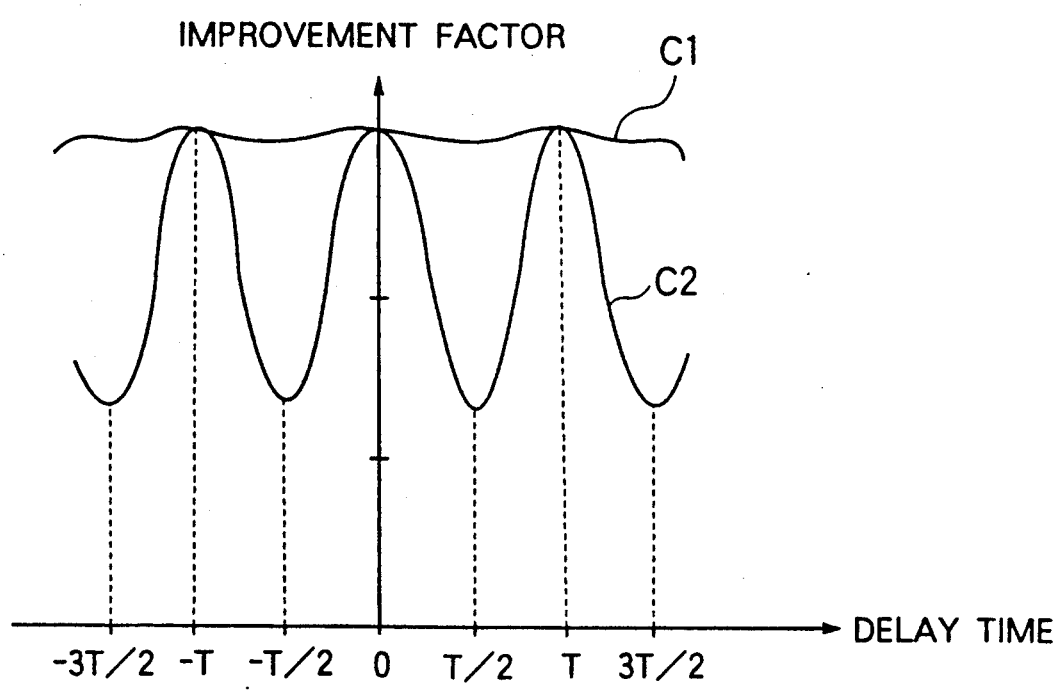
FIG. 3 is a graphical representation for use in describing a merit of this invention in comparison with a conventional system.

Referring to FIG. 3, wherein an abscissa and an ordinate represent a delay time (sec) between an interference component and a cancellation signal and an improvement factor (arbitrary unit), respectively, a curve C1 represents a characteristic of the system illustrated in FIGS. 1 and 2 and is substantially invariable even when the delay time is changed. On the other hand, a curve C2 shows a characteristic of a conventional system which comprises, without a frequency doubler, a transversal filter which have two delay units of a delay time equal to the symbol period. As readily understood from the curve C2, the improvement factor is drastically reduced at every period of T/2. Accordingly, the system according to this invention is very effective as compared with the conventional system.

Figure 4:
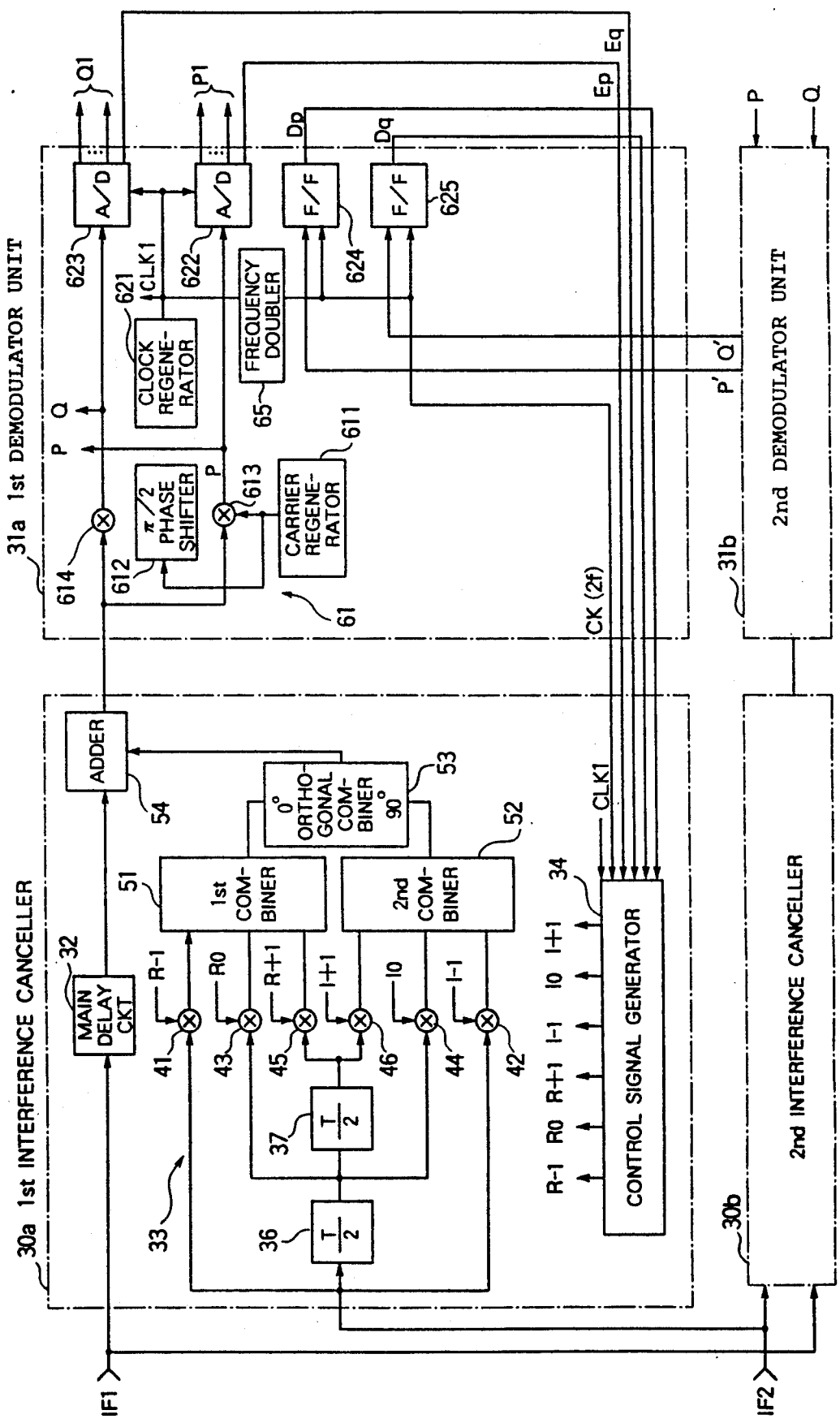
FIG. 4 is a block diagram of a cross-polarization interference cancellation system according to a second embodiment of this invention.

Referring to FIG. 4, a cross-polarization interference cancellation system according to a second embodiment of this invention is similar in structure and operation to that illustrated in FIG. 1 except that the frequency doubler 65 is supplied with the first clock pulses CLK1 of the first demodulator unit 31a to supply a sequence of specific clock pulses CK to the flip-flops 624 and 625 and that the flip-flops 624 and 625 are given the primary and the subsidiary detected signals P' and Q' from the second demodulator unit 31b. In addition, the first clock pulses CLK1 are supplied to the control signal generator 34 of the first interference canceller 30a. In this connection, the primary and the subsidiary quadrant detection signals Dp and Dq are delivered to the control signal generator 34 of the first interference canceller 30a together with the first and the second error signals Ep and Eq. This means that the quadrant detection circuit, such as the flip-flops 624, 625, of the first demodulator unit 31a reproduces the primary and the subsidiary quadrant detection signals Dp and Dq for the second input signal IF2. Similar operation is carried out in the second demodulator unit 31b to reproduce the primary and the subsidiary quadrant detection signals Dp and Dq for the first input signal IF1 and to the primary and the subsidiary detected signals P and Q sent to the first demodulator unit 31a.

Figure 5:
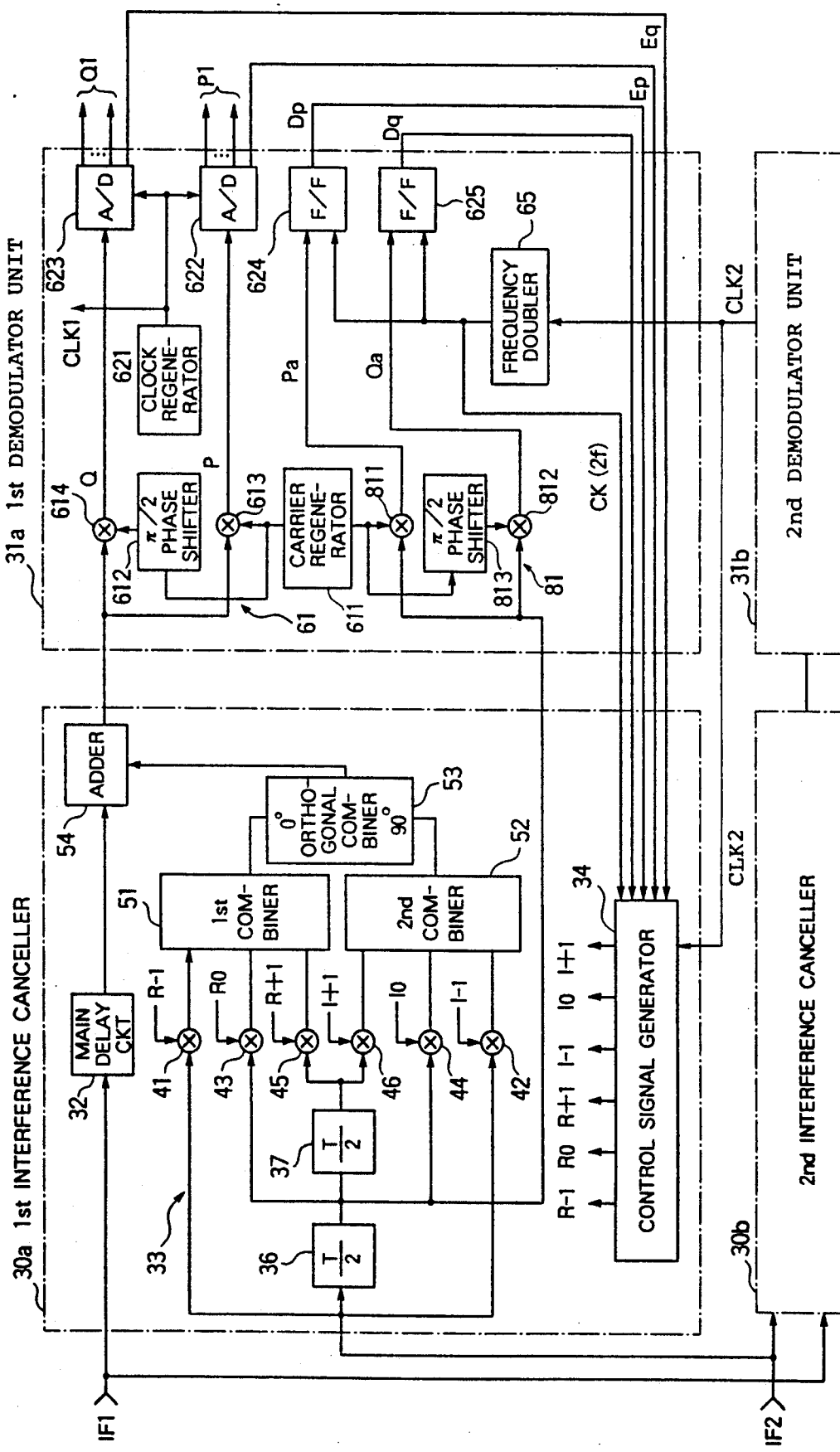
FIG. 5 is a block diagram of a cross-polarization interference cancellation system according to a third embodiment of this invention.

Referring to FIG. 5, a cross-polarization interference cancellation system according to a third embodiment of this invention is similar in structure to that illustrated in FIG. 1 except that an additional coherent detector 81 is included in the first demodulator unit 31a and operable in response to a local output signal which is derived from the center tap of the transversal filter 33 of the first interference canceller 30a and which is the second input signal IF2 delayed by the delay unit 36. As a result, the local output signal has the same phase as the first interference free signal sent to the coherent detector 61. The second interference circuit 30b and the second demodulator unit 31b are similar to the first interference canceller 30a and the first demodulator unit 31a, although not shown in FIG. 5.

In the illustrated example, the additional coherent detector 81 comprises first and second additional multipliers 811 and 812 which are supplied from the carrier regenerator 611 with the local output signal directly and through an additional π/2 phase shifter 813 to be multiplied by the local output signal. Thus, a pair of additional detected signals Pa and Qa is supplied from the first and the second additional multipliers 811 and 812 to the flip-flops 624 and 625 operable in response to the specific clock pulses CK supplied from the frequency doubler 65. The illustrated frequency doubler 65 serves to double the clock frequency of the second clock pulses CLK2 sent from the second demodulator unit 31b like in FIG. 1. At any rate, the flip-flops 624 and 625 deliver the primary and the subsidiary quadrant detection signals Dp and Dq to the control signal generator 34 of the first interference canceller 30a.

Similar operation is executed in the second demodulator unit 31b to produce the primary and the subsidiary quadrant detection signals Dp and Dq by the use of an additional coherent detector identical with that of the first demodulator unit 31a.

Figure 6:
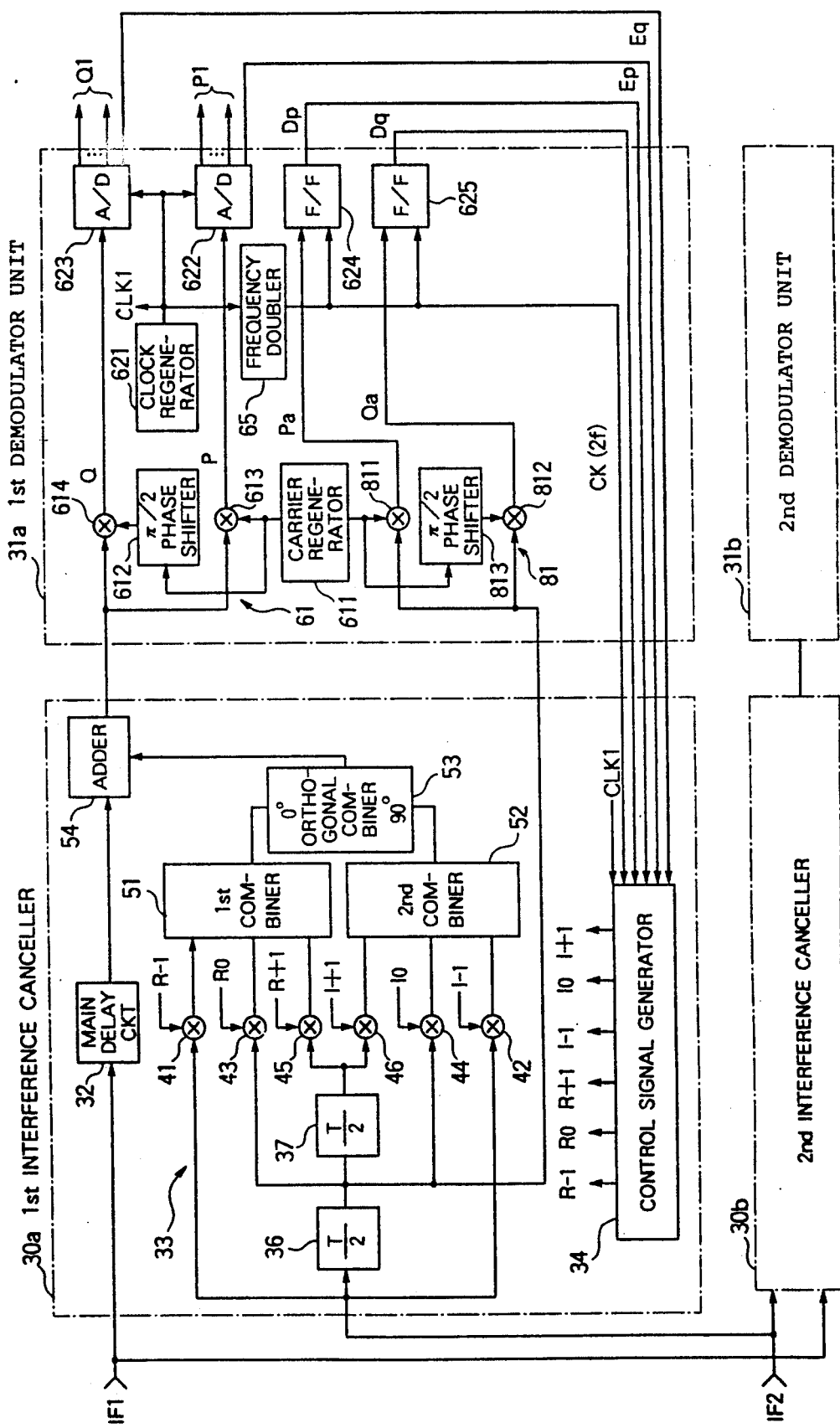
FIG. 6 is a block diagram of a cross-polarization interference cancellation system according to a fourth embodiment of this invention.

Referring to FIG. 6, a cross-polarization interference cancellation system according to a fourth embodiment of this invention is similar in structure and operation to that illustrated in FIG. 5 except that the frequency doubler 65 is supplied from the clock regenerator 62 of the first demodulator unit 31a with the first clock pulses CLK1 having the clock frequency f, instead of the second clock pulses CLK2 sent from the second demodulator unit 31b. In addition, the first clock pulses CLK1 are sent to the control signal generator 34 of the first interference canceller 30a.

The second interference canceller 30b and the second demodulator unit 31b are operable in a manner similar to the first interference canceller 30a and the first demodulator unit 31a and substantially independent of the latter.

Thus, the frequency doubler 65 of FIGS. 1, 4, 5, and 6 is supplied with the clock pulses CLK1 or CLK2. This is because the clock pulses CLK1 and CLK2 have the clock frequencies generally different from each other.

Figure 7:
FIG. 7 is a time chart for use in describing operations of the cross-polarization interference cancellation system according to the first through the fourth embodiments of this invention.
Figure 7:
Figure 7:
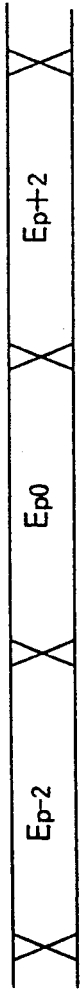
Figure 7:
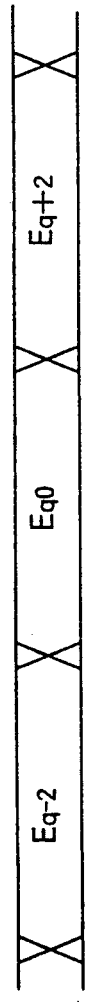
Figure 7:
Figure 7:
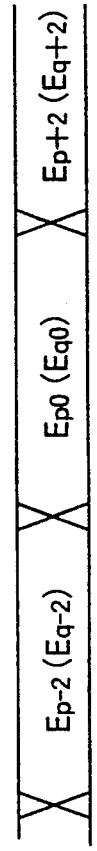
Figure 7:
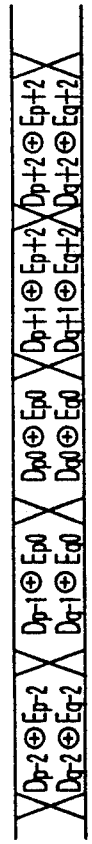
Figure 7:

Referring to FIG. 7 afresh and FIG. 2 again, the primary and the subsidiary quadrant detection signals (Dp) and (Dq) are read out of the first and the second shift registers 701 and 702 in synchronism with the specific clock pulses CK of the double clock frequency, as illustrated in FIGS. 7(a) and (b). As shown in FIG. 7(a) and (b), each of the primary and the subsidiary quadrant detection signals Dp and Dq is successively produced at every one of the specific clock pulses CK in orders of Dp−1, Dp0, Dp+1, ..., and Dq−1, Dp0, Dq+1, ...

On the other hand, the first and the second output error signals (Ep) and (Eq) are read out of the third and the fourth shift registers 703 and 704 at every one of the second clock pulses CLK2, as shown in FIGS. 7(c) and (d), respectively. Inasmuch as the second clock pulses CLK2 have twice the clock period of the specific clock pulses CK, each of the third and the fourth shift registers 703 and 704 is loaded with every other signal of each of the first and the second output error signals in the form of $Ep-2$, $Ep0$, and $Ep+2$, or $Eq-2$, $Eq0$, and $Eq-2$, as illustrated in FIGS. 7(c) and (d).

As shown in FIG. 7(e), the first and the second flip-flops 711 and 712 produce the primary and the subsidiary retimed quadrant signals $Dp0$ and $Dq0$ at every clock pulse of the specific clock pulses CK, respectively.

Likewise, the first and the second output error signals are read out of the third and the fourth shift registers 703 and 704 in response to the second clock pulses CLK2. However, each of the third and the fourth shift registers 703 and 704 is loaded with every other signal of each of the first and the second output error signals, as mentioned before. This means that every other signal is stored in each flip-flop 713 and 715 and produced therefrom in a manner illustrated in FIG. 7(f) even when the specific clock pulses CK are given to the flip-flops 713 and 715. In other words, output signals of the flip-flops 713 and 715 are merely delayed relative to the first and the second output error signals by a single clock period of the specific clock pulses CK and can therefore be represented by $Ep-2$, $Ep0$, and $Ep+2$ or $Eq-2$, $Eq0$, and $Eq+2$, as shown in FIG. 7(f). From this fact, it is readily understood that all of the first and the second output error signals, such as $Ep-1$, $Ep0$, $Ep+1$, are not practically produced from the flip-flops 713, 714, 715, and 716. Stated otherwise, only even number ones of the output error signals are produced with odd number ones of the output error signals neglected, although such output error signals are labeled $Ep-1$, $Ep0$, $Ep+1$, $Eq-1$, $Eq0$, and $Eq+1$ in FIG. 7.

Accordingly, each of the first and the second Exclusive OR circuits 721 and 722 practically carries out Exclusive OR calculation as shown in FIG. 7(g) while each of the fourth and the fifth Exclusive OR circuits 724 and 725 practically carries out Exclusive OR calculation as shown in FIG. 7(h). In any event, the odd numbered output error signals are not used in such calculations. In addition, the even numbered output error signals do not always include any information effective for producing the control signals concerned with the odd numbered output error signals. Furthermore, the odd numbered output error signals must not be neglected on production of the control signals because they are correlated with the even numbered output error signals due to incompletion of circuitry. For example, wrong correlation signals are produced by calculations, such as $Dp-2 \oplus Ep-2$, $Dp0 \oplus Ep0$, and the like, although correct correlation signals are produced by calculations, such as $Ep-1 \oplus Ep0$, $Dp+1 \oplus Ep+2$, and the like.

Therefore, the illustrated control signal generator 34 is unstable in control operation and needs a complex compensation circuit so as to compensate for such unstable control operation.

Figure 8:
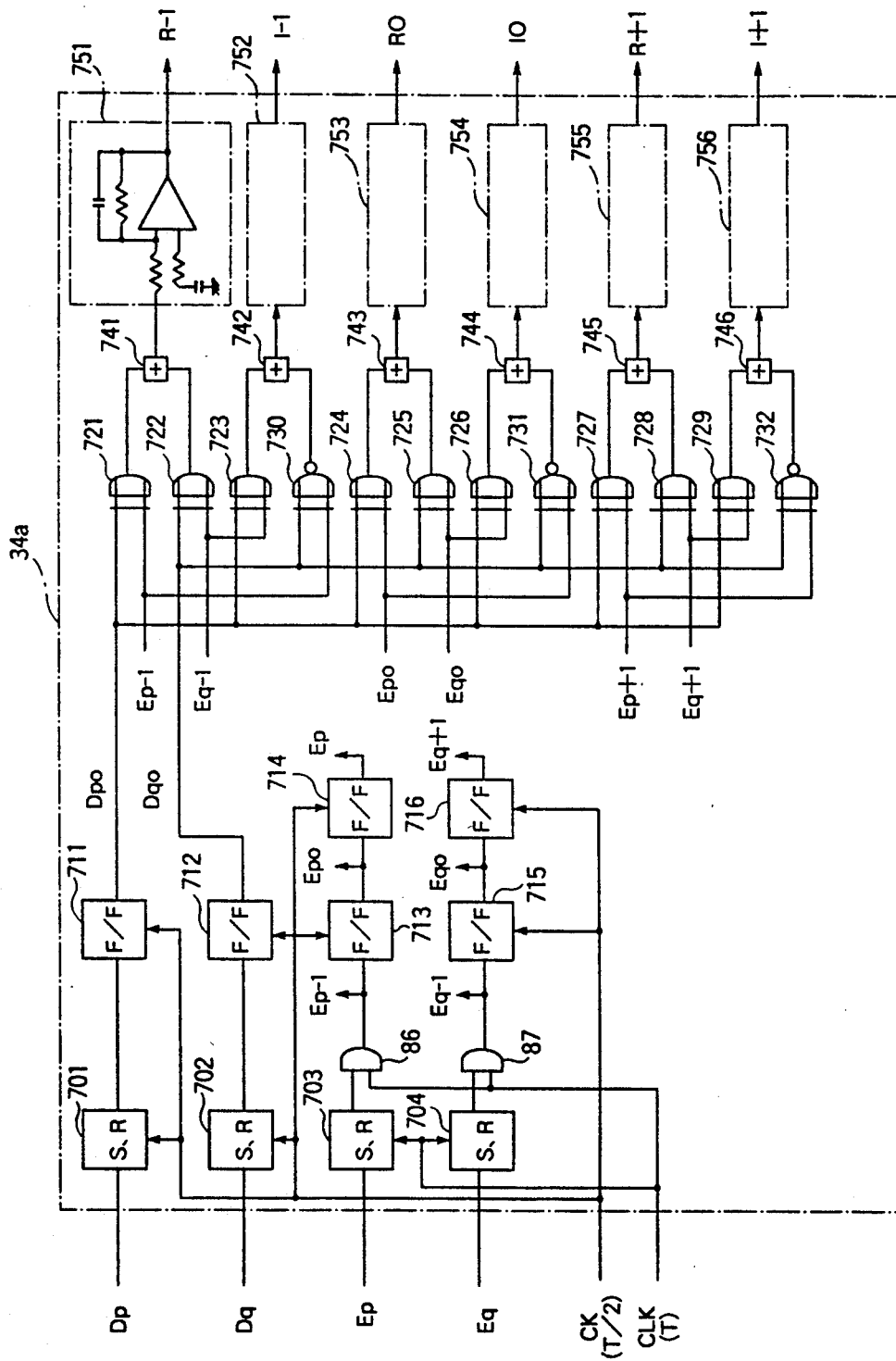
FIG. 8 is a block diagram of a control signal generator for use in the cross-polarization interference cancellation system illustrated in FIGS. 1, 4, 5, and 6.

Referring to FIG. 8, a control signal generator 34a is available for the cross-polarization interference cancellation system according to the first, the second, the third, and the fourth embodiments of this invention, as illustrated in FIGS. 1, 4, 5, and 6. More specifically, the control signal generator 34a shown in FIG. 8 is operable in response to the primary and the subsidiary quadrant detection signals Dp and Dq, the first and the second error signals Ep and Eq, and a selected one of the first and the second clock pulses CLK1 and CLK2 of the clock frequency, and the specific clock pulses CK of the double clock frequency and is similar in structure to that illustrated in FIG. 2 except that first and second AND gates 86 and 87 are interposed between the third shift register 703 and the third flip-flop 713 and between the fourth shift register 704 and the fifth flip-flop 715, respectively. The selected clock pulses are depicted at CLK with a suffix omitted.

The first through the fourth shift registers 701 to 704 serve to make time differences equal to one another among the quadrant detection signals Dp and Dq and the error signals Ep and Eq and to produce adjusted quadrant detection signals and adjusted error signals. Thereafter, the first AND gate 86 is supplied as one adjusted error signal with the first output error signal from the third shift register 703 together with the selected clock pulses CLK while the second AND gate 87 is supplied as another one of the adjusted error signals with the second error signal from the fourth shift register 704 together with the selected clock pulses CLK. Herein, it is assumed that the selected clock pulses CLK have the clock period of T (namely, a reciprocal of the clock frequency f), as mentioned before, and a duty ratio of 50% and that the specific clock pulses CK have a specific clock period of T/2 (namely, a reciprocal of the double clock frequency (2f). This shows that each selected clock pulse CLK is divided into a preceding half duration (T/2) and a following half duration (T/2) which take a high level "H" and a low level "L", respectively. Under the circumstances, each of the first and the second AND gates 86 and 87 is opened only for the preceding half duration (T/2) to allow each output error signal Ep or Eq to pass therethrough.

Figure 9:
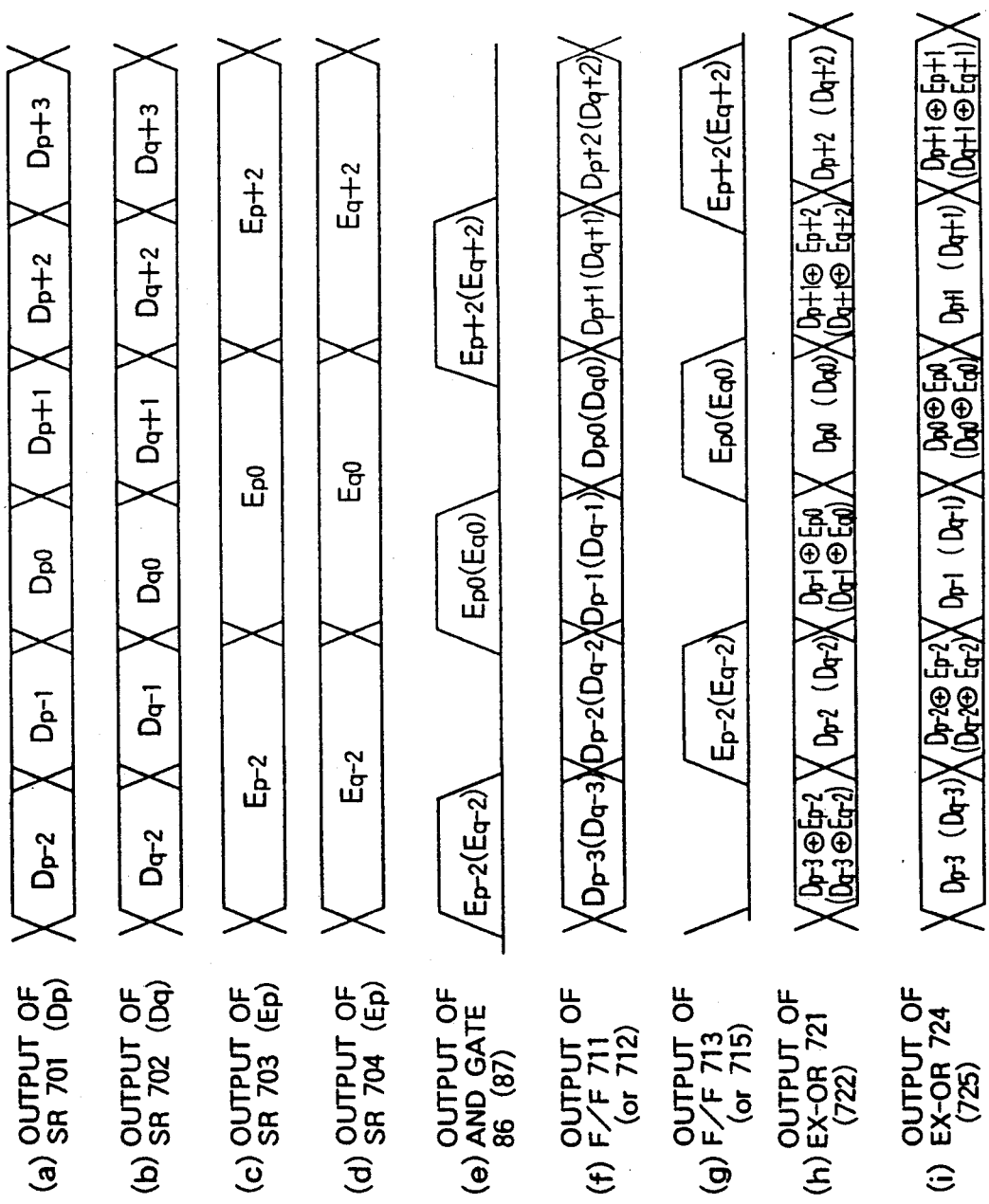
FIG. 9 is a time chart for use in describing operation of the control signal generator illustrated in FIG. 8.

Referring to FIG. 9, the first through the fourth shift registers 701 to 704 produce the output signals Dp, Dq, Ep, and Eq like in FIG. 2, as illustrated in FIGS. 9(a) through (d). Each of the first and the second error signals are extracted from every other one of each of the first and the second error signals Ep and Eq and produced in the form of $Ep-2$, $Ep0$, $Ep+2$, $Eq-2$, $Eq0$, and $Eq+2$ which are sent to the first and the second AND gates 86 and 87. Inasmuch as each of the first and the second AND gates 86 and 87 is opened only for the preceding half duration, as mentioned before, the first and the second AND gates 86 and 87 produce first and second gate output signals as illustrated in FIG. 9(e). Specifically, each of the first and the second gate output signals appears for the preceding half duration in the form of $Ep-2$, $Ep0$, $Ep+2$ or $Eq-2$, $Eq$, $Eq+2$, with the first and the second gate output signals inhibited for the following half duration. The first and the second gate output signals appearing for the inhibited durations are considered as production of $Ep-1$, $Ep+1$, $Eq-1$, $Eq+1$, which take "0" levels. Taking this into account, the first and the second gate output signals may be regarded as being produced at every specific clock period (T/2) in the form of $Ep-2$, $Ep-1$, $Ep0$, $Ep+1$, and the like.

As illustrated in FIG. 9(f), the first and the second flip-flope 711 and 712 produce the primary and the subsidiary retimed quadrant signals $Dp0$ and $Dq0$ in synchronism with the specific clock pulses CK, like in FIG. 2(e). On the other hand, the first gate output signals shown in FIG. 9(e) are successively delayed by the specific clock period (T/2) through the third and the fourth flip-flops 713 and 714, as shown in FIG. 9(g). Likewise, the second gate output signals are also successively delayed by the specific clock period through the fifth and the sixth flip-flops 715 and 716. At any rate, the preceding, the current, the following error signals $Ep+1$, $Ep0$, and $Ep-1$, $Eq+1$, $Eq0$, and $Eq-1$ are successively produced from the first and the second AND gates 86 and 87, the third and the fifth flip-flops 713 and 715, and the fourth and the sixth flip-flops 714 and 716 at every specific clock period T/2. Accordingly, the preceding, the current, the following error signals Ep+1, Ep0, and Ep−1, Eq+1, Eq0, and Eq−1 are sent to the Exclusive OR circuits 721 to 729 and the Exclusive NOR circuits 730 to 732 in synchronism with the primary and the subsidiary retimed quadrant signals Dp0 and Dq0.

Each of the Exclusive OR circuits 721 to 729 and the Exclusive NOR circuits 730 to 732 produces, as the correlation signals, the primary or the subsidiary retimed quadrant signals Dp0 or Dq0 for each following half duration T/2 because of no production of any output error signals, as illustrated in FIGS. 9(h) and (i). The correlation signals are supplied from the respective Exclusive OR and NOR circuits 721 to 732 to the first through the sixth adders 741 to 746 in pairs to produce results of addition. The results of addition are integrated by the first through the sixth integrators 751 to 756 to produce the control signals R0, R+1, R−1, I0, I+1, and I−1. Each of the control signals R0, R+1, R−1, I0, I+1, and I−1 is delivered to each tap of the transversal filter 33 (FIG. 1) as weighting control signals.

Thus, the weighting control signals are obtained by integrating the results of addition sent from the adders and the primary and the subsidiary retimed quadrant signals Dp0 and Dq0 appear at random, namely, without any correlation. This means that, when the primary and the subsidiary retimed quadrant signals Dp0 and Dq0 are integrated by the integrators into integrated quadrant signals, the integrated quandrant signals are rendered into noncorrelative signals which are not correlated to the error signals. Therefore, each of the weighting control signals is proportional to the correlation signals appearing at the Exclusive OR and the Exclusive NOR gates 721 to 732 and, as a result, makes stable operation possible in the cross-polarization interference cancellation system illustrated in FIGS. 1, 4, 5, and 6. Thus, the integrators 751 to 756 may serve to average the retimed signals.

Figure 10:
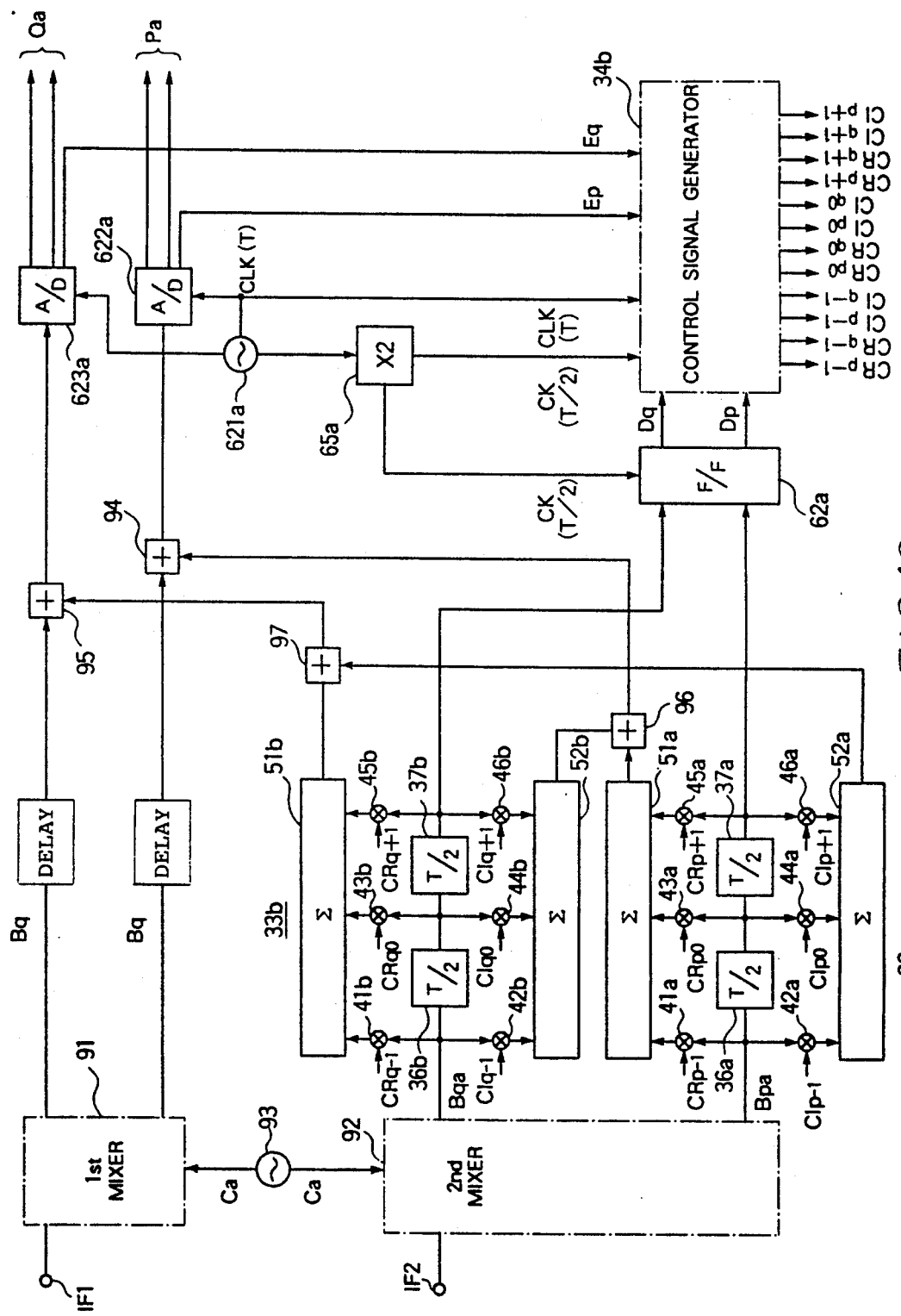
FIG. 10 is a block diagram of a cross-polarization interference cancellation system available for a fifth embodiment of this invention.
Figure 11:
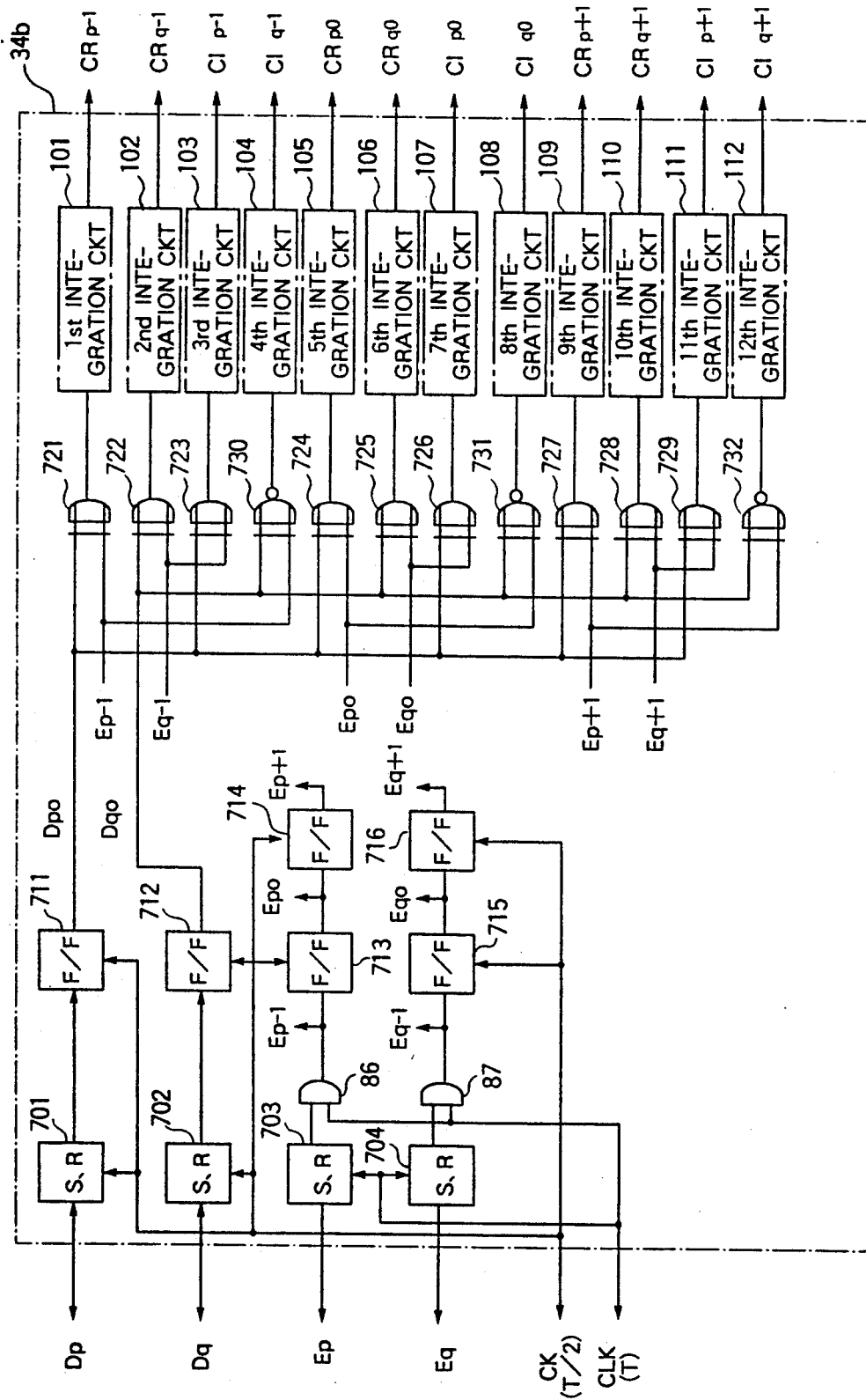
FIG. 11 is a block diagram of a control signal generator used in the cross-polarization interference cancellation system illustrated in FIG. 10.

Referring to FIGS. 10 and 11, a cross-polarization interference cancellation system according to a fifth embodiment of this invention is operable in a baseband frequency region which is different from the intermediate frequency region. The illustrated system comprises an interference canceller 30' and a demodulator unit 31' which are practically used in combination with another pair of an interference canceller and a demodulator unit (not shown) like in FIG. 1.

In FIG. 10, first and second mixers 91 and 92 are operable as coherent detectors in response to the first and the second input signals IF1 and IF2 and a carrier frequency signal Ca sent from a carrier signal regenerator 93 of a voltage controlled type. As a result, a first pair of baseband analog signals is produced from the first mixer 91 as first and second primary baseband signals Bp and Bq while a second pair of baseband signals is produced from the second mixer 92 as first and second subsidiary baseband signals Bpa and Bqa.

The first and the second primary baseband signals Bp and Bq are delivered to first and second adder circuits 94 and 95, respectively, which are operable in a manner similar to the adder 54 illustrated in FIG. 1 and which serves as the interference canceller 30'.

On the other hand, the first and the second subsidiary baseband signals Bpa and Bqa are sent from the second mixer 92 to first and second baseband transversal filters 33a and 33b each of which is of a fractional spacing type and which is similar in structure to that illustrated in FIG. 1 and to each other.

More specifically, the first baseband transversal filter 33a comprises first and second primary delay units 36a and 37a each of which has a delay time equal to the specific clock period T/2. The first and second primary delay units 36a and 37a are connected at a center tap and define an input tap and an output tap, respectively. The input tap is connected to a pair of multipliers 41a and 42a weighted or controlled by control signals depicted at CRp−1 and CIp−1 while the center tap is connected to another pair of multipliers 43a and 44a controlled by control signals CRp0 and CIp0. Likewise, the output tap is connected to a pair of multipliers 45a and 46a controlled by control signals CRp+1 and CIp+1. The multipliers 41a, 43a, and 45a are connected to a first primary combiner 51a while the multipliers 42a, 44a, and 46a are connected to a second primary combiner 52a.

Like the first baseband transversal filter 33a, the second baseband transversal filter 33b comprises first and second subsidiary delay units 36b and 37b each of which has a delay time equal to the specific clock period T/2. The first and the second subsidiary delay units 36b and 37b are connected at a center tap and define an input tap and an output tap, respectively. The input tap is connected to a pair of multipliers 41b and 42b weighted or controlled by control signals depicted at CRq−1 and CIq−1 while the center tap is connected to another pair of multipliers 43b and 44b controlled by control signals CRq0 and CIq0. Likewise, the output tap is connected to a pair of multipliers 45b and 46b controlled by control signals CRq+1 and CIq+1. The multipliers 41b, 43b, and 45b are connected to a first subsidiary combiner 51b while the multipliers 42b, 44b, and 46b are connected to a second subsidiary combiner 52b.

Output signals of the first primary combiner 51a and the second subsidiary combiner 52b are summed up by a third adder circuit 96 to be sent to the first adder circuit 93 as a first cancellation signal while output signals of the second primary combiner 52a and the first subsidiary combiner 51b are summed up by a fourth adder circuit 97 to be sent to the second adder circuit 94 as a second cancellation signal. The first and the second cancellation signals are subtracted by the first and the second primary baseband signals Bp and Bq to be sent as primary and subsidiary interference free signals to first and second analog-to-digital converters 622a and 623a. The first and the second analog-to-digital converters 622a and 623a are operable in response to a sequence of clock pulses CLK produced by a clock regenerator 621a. The clock pulses CLK have a clock period T which is equal to a reciprocal of a clock frequency f like in the other embodiments.

The first and the second analog-to-digital converters 622a and 623a produce primary and subsidiary sets of demodulated signals Pa and Qa together with first and second error signals Ep and Eq. The first and the second error signals Ep and Eq are delivered to a control signal generator 34b which will be described later and which serves as a part of the interference canceller 30'.

The clock pulses CLK are also sent from the clock regenerator 621a to a frequency doubler 65a which is similar to that illustrated in the other figures and which produces a sequence of specific clock pulses CK having a half (T/2) of the clock period T equal to a reciprocal of the double clock frequency 2f.

The specific clock pulses CK are delivered to the control signal generator 34b on one hand and to a demodulating flip-flop circuit 62a which is operable in a manner similar to a combination of the flip-flops 624 and 625 and which forms a part of the demodulator unit 31'. The illustrated demodulating flip-flop circuit 62a is connected to the output taps of the primary and the subsidiary baseband transversal filters 33a and 33b and is therefore supplied with delayed filter output signals. As a result, the demodulating flip-flop circuit 62a supplies the control signal generator 34b with primary and subsidiary quadrant detection signals Dp and Dq.

In this connection, a combination of the first and the second analog-to-digital converters 622a and 623a, the demodulating flip-flop circuit 62a, the clock regenerator 621a, and the frequency doubler 65a serves as the demodulator unit 31' together with the first and the second mixers 91 and 92 while the remaining circuit elements serves as the interference canceller 30'.

Now, the control signal generator 34b is operable in response to the primary and the subsidiary quadrant detection signals Dp and Dq, the first and the second error signals Ep and Eq, the clock pulses CLK, and the specific clock pulses CK to deliver the control signals CRp−1 to CIq+1 to the multipliers 41a to 46a and 41b to 46b of the primary and the subsidiary baseband transversal filters 33a and 33b.

In FIG. 11, the control signal generator 34b is similar in structure to that illustrated in FIG. 8 except that first through twelfth integration circuits 101 to 112 are connected direct to the Exclusive OR and the Exclusive NOR circuits 721 to 732 without the first through the sixth adders 741 to 746 illustrated in FIG. 8. This means that the illustrated control signal generator 34b comprises the first and the second AND gates 86 and 87 between the third shift register 703 and the third flip-flop 713 and between the fourth shift register 704 and the fifth flip-flop 715, respectively, like in FIG. 8. In addition, the control signals CRp−1 to CIq+1 are delivered to the multipliers 41a to 46a and 41b to 46b in a known manner. Inasmuch as the remaining parts of the control signal generator 34b are known in the art, description will not be made about the illustrated control signal generator 34b any longer.

Figure 12:
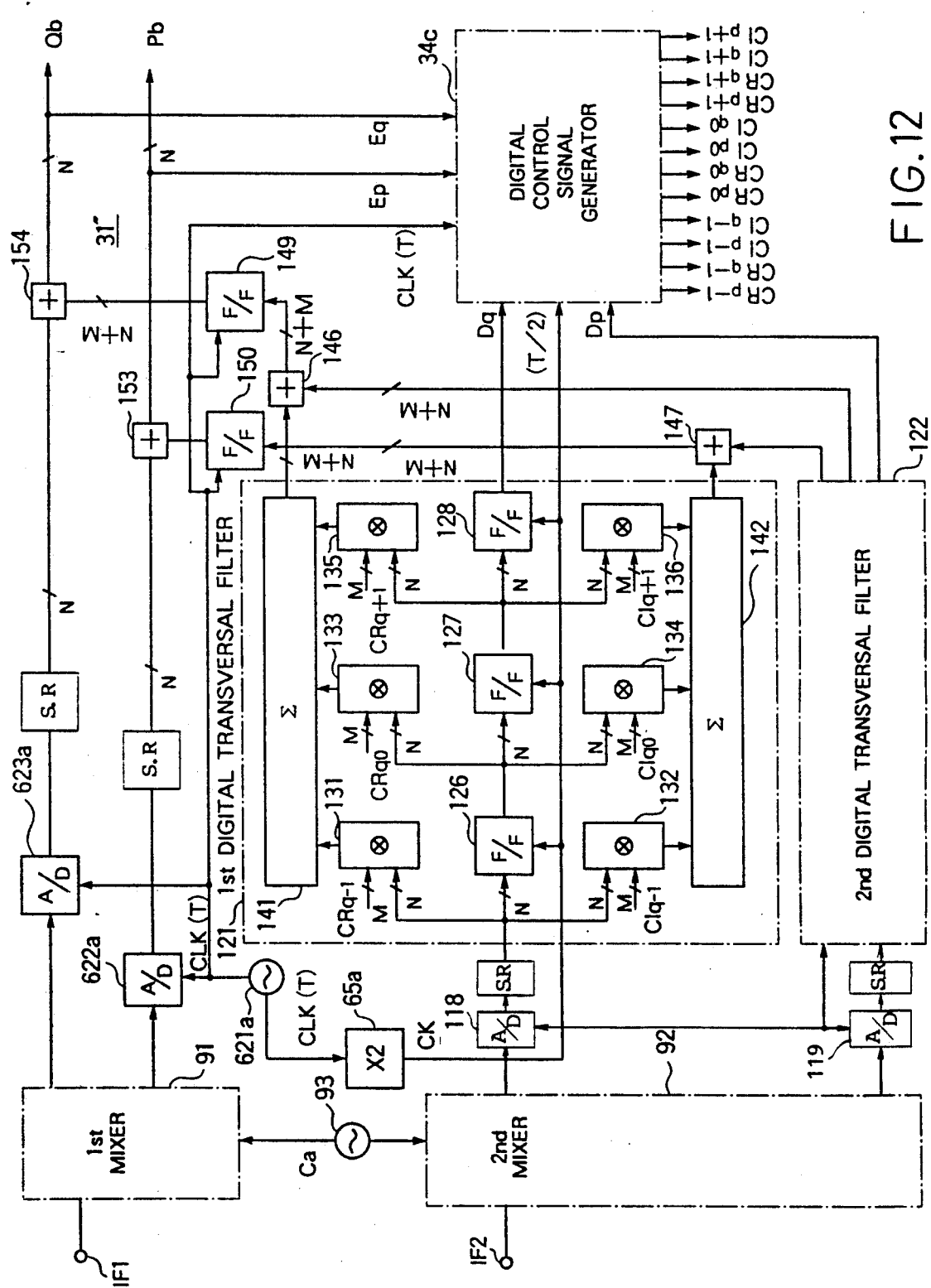
FIG. 12 is a block diagram of a cross-polarization interference cancellation system available for a sixth embodiment of this invention.

Referring to FIG. 12, a cross-polarization interference cancellation system according to a sixth embodiment of this invention is operable in a digital fashion, as will become clear as the description proceeds. In other words, the illustrated system comprises an interference canceller 30'' and a demodulator unit 31' both of which carry out digital operations. More particularly, the first and the second mixers 91 and 92 mix the first and the second input signals IF1 and IF2 with the carrier frequency signals Ca sent from the carrier signal generator 93, like in FIG. 10. Consequently, the first mixer 91 produces a first pair of baseband signals which are analog signals and which may be called baseband analog signals. Similarly, the second mixer 92 produces a second pair of baseband analog signals and supplies the same through third and fourth analog-to-digital converters 118 and 119 to first and second digital baseband transversal filters 121 and 122 which may be similar to each other and which will be simply called first and second transversal digital filters hereinunder. For brevity of description, description will be made about the first transversal digital filter 121 alone.

The first digital transversal filter 121 is operable in response to a digital signal of N bits which is sent from the third analog-to-digital converter 118 as a result of analog-to-digital conversion. The illustrated digital transversal filter 121 comprises first and second flip-flop units 126 and 127 which are connected in series to each other and which are operable in a manner similar to the flip-flops 36 and 37 (suffixes omitted) of FIG. 10. In this connection, the first and the second flip-flop units 126 and 127 define an input tap, a center tap, and an output tap like in FIG. 10. In addition, the second flip-flop unit 127 is connected to a third flip-flop unit 128 in series. Each of the first through the third flip-flop units 126 to 128 is composed of N flip-flops and serves to delay the digital signal by the half of the clock period T like in the delay units 36 and 37 illustrated in FIG. 10.

The input and the center taps are connected to first and second digital multipliers 131 and 132 and third and fourth digital multipliers 133 and 134, as illustrated in FIG. 12 and the output tap is connected to fifth and sixth digital multipliers 135 and 136. Each of the digital multipliers 131 to 136 is supplied with digital control signals CRq−1, CIq−1, CRq0, CIq0, CRq+1, and CIq+1 from a digital control signal generator 34c which will be described later. Each of the digital control signals CRq−1 to CIq+1 is composed of M bits. At any rate, the first, the third, and the fifth digital multipliers 131, 133, and 135 supply a first digital combiner 141 with results of multiplications while the second, the fourth, and the sixth digital multipliers 132, 134, and 136 supply a second digital combiner 142 with results of multiplications.

It is to be noted that the first through the third flip-flop units 126 to 128 are connected to the frequency doubler 65a supplied with the clock pulses CLK having the clock period T sent from the clock regenerator 621a. Therefore, the first through the third flip-flop units 126 to 128 successively delay the digital signal in response to the specific clock pulses CK having the specific clock period T/2. In any event, the first and the second digital combiners 141 and 142 supply first and second digital adders 146 and 147 with first and second digital output signals each of which has (N+M) bits. The first and the second digital adders 146 and 147 are supplied from the second digital transversal filter 122 with similar digital output signals. Each pair of the digital output signals is summed up by the first and the second digital adders 146 and 147 to be sent to fourth and fifth flip-flop units 149 and 150 of (N+M) bits which are operable in response to the clock pulses CLK to produce first and second interference signals representative of interference components.

In addition, the third flip-flop unit 128 of the first digital transversal filter 121 is operable to produce the subsidiary quadrant detection signal Dq. Likewise, the primary quadrant detection signal Dp is produced by the second digital transversal filter 122.

It is mentioned here that the first pair of the baseband analog signals are delivered to the first and the second analog-to-digital converters 622a and 623a which are supplied with the clock pulses CLK from the clock regenerator 621a and which may be operable as a part of the interference canceller 30'' in the illustrated example. Consequently, first and second converted digital signals are sent to third and fourth digital adders 153 and 154 connected to the fifth and the fourth flip-flops 150 and 149. As a result, the first and the second interference signals are subtracted from the second and the first converted digital signals by the fourth and the third digital adders 154 and 153 to be produced as interference free signals. The interference free signals are produced as primary and subsidiary demodulated signals Pb and Qb from the third and the fourth digital adders 153 and 154 together with the first and the second error signals Ep and Eq which are delivered to the digital control signal generator 34c. Thus, the third and the fourth digital adders 153 and 154 may be referred to as the demodulator unit 31''.

Figure 13:
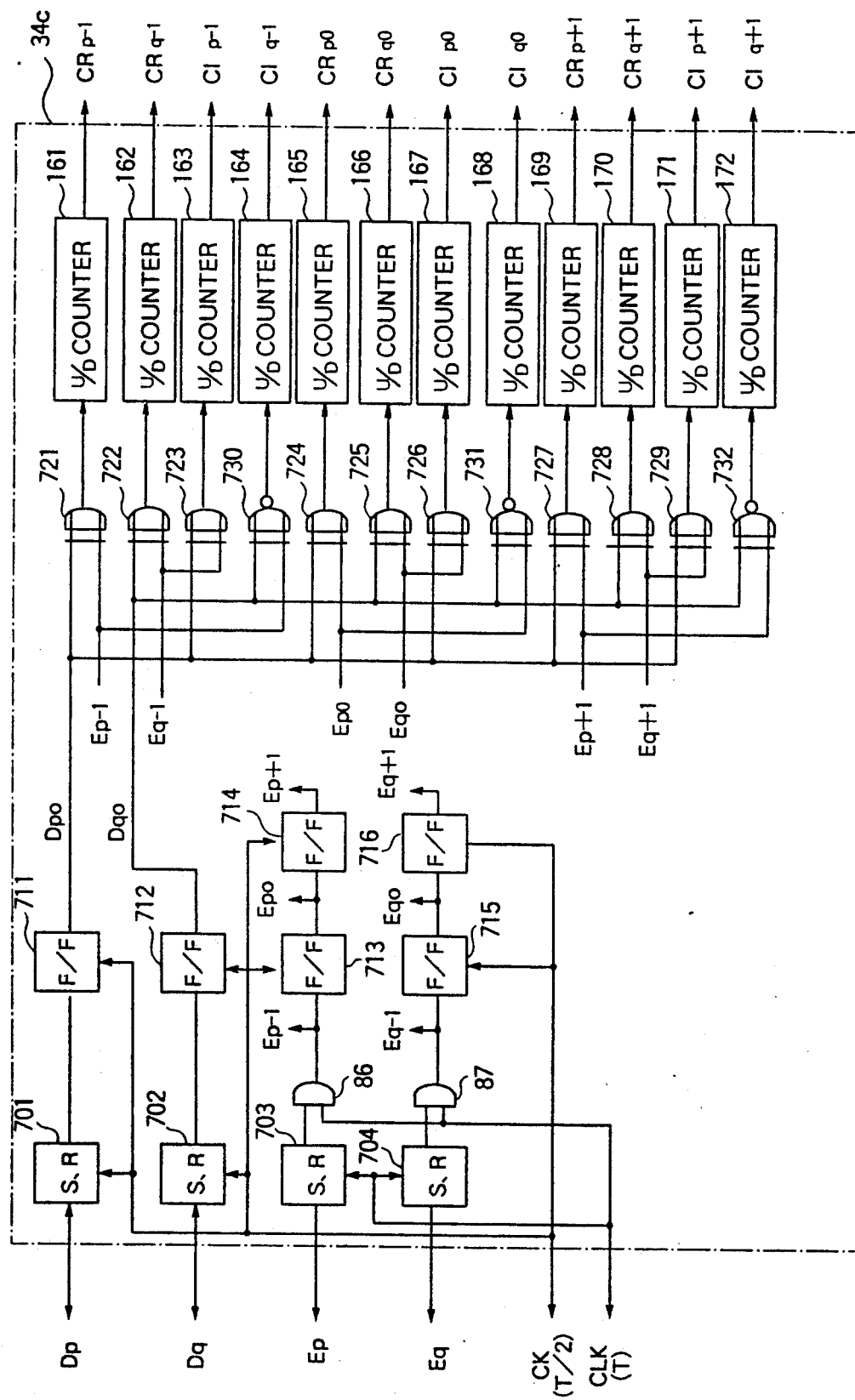
FIG. 13 is a block diagram of a control signal generator used in the cross-polarization interference cancellation system illustrated in FIG. 12.

Referring to FIG. 13 in addition to FIG. 12, the digital control signal generator 34c is similar to the control signal generator 34b illustrated in FIG. 11 except that the Exclusive OR and the Exclusive NOR circuits 721 to 732 are connected to first through twelfth up/down counters 161 to 172. Such a digital control signal generator 34c is known in the art except that the first and the second AND gates 86 and 87 are interposed between the third shift register 703 and the third flip-flop 713 and between the fourth shift register 704 and the fifth flip-flop 715 and are operable in the manner mentioned before. Therefore, the digital control signal generator 34c will not be described any longer.

Figure 14:
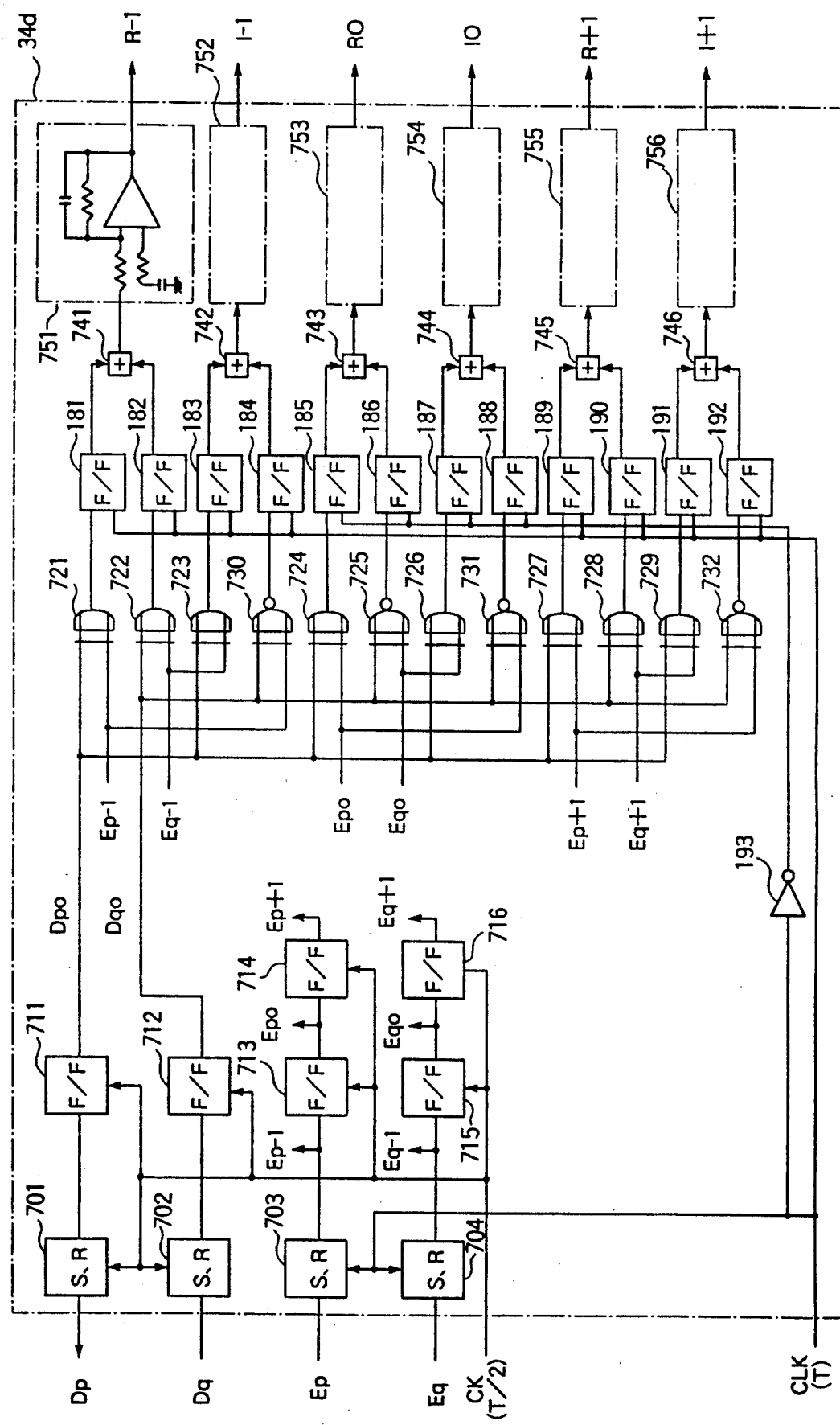
FIG. 14 is a block diagram of a control signal generator for use in a cross-polarization interference cancellation system illustrated in FIGS. 1, 4, 5, and 6.

Referring to FIG. 14, a control signal generator 34d is available for the interference canceller 30a which is operable within the intermediate frequency region and which is illustrated in either one of FIGS. 1, 4, 5, and 6. Thus, the control signal generator 34d forms a cross-polarization interference cancellation system together with the interference canceller 30a and is similar in structure to the control signal generator 34 illustrated in FIG. 2 except that first through twelfth flip-flop elements 181 to 192 are interposed between the first through the sixth adder circuits 741 to 746 and the Exclusive OR and the Exclusive NOR circuits 721 to 732 and are controlled by the clock pulses CLK or an inverted clock pulses sent through an inverter 193. More particularly, the clock pulses CLK are delivered to the first through the fourth flip-flop elements 181 to 184 and the ninth through the twelfth flip-flop elements 189 to 192 while the inverted clock pulses are delivered to the fifth through the eighth flip-flop elements 185 to 188.

Herein, the first through the fourth flip-flop elements 181 to 184 are connected to the first through the third Exclusive OR circuits 721 to 723 and the first Exclusive NOR circuit 730, which are operable to detect correlations between the primary and the subsidiary retimed quadrant signals Dp0 and Dq0 and the following error signals Ep−1 and Eq−1. Likewise, the fifth through the eighth flip-flop elements 185 to 188 are connected to the fourth through the sixth Exclusive OR and the second Exclusive NOR circuits 724 to 726 and 731, which are operable to detect correlations between the primary and the subsidiary retimed quadrant signals Dp0 and Dq0 and the current error signals Ep0 and Eq0, while the ninth through the twelfth flip-flop elements 189 to 192 are connected to the seventh through the ninth Exclusive OR and the third Exclusive NOR circuits 727 to 729 and 732, which are operable to detect correlations between the primary and the subsidiary retimed quadrant signals Dp0 and Dq0 and the preceding error signals Ep+1 and Eq+1.

From this fact, it is understood that the inverted clock pulses are only used to memorize the correlations between the primary and the subsidiary retimed quadrant signals Dp0 and Dq0 and the current error signals Ep0 and Eq0 into the fifth through the eighth flip-flop elements 185 to 188.

Figure 15:
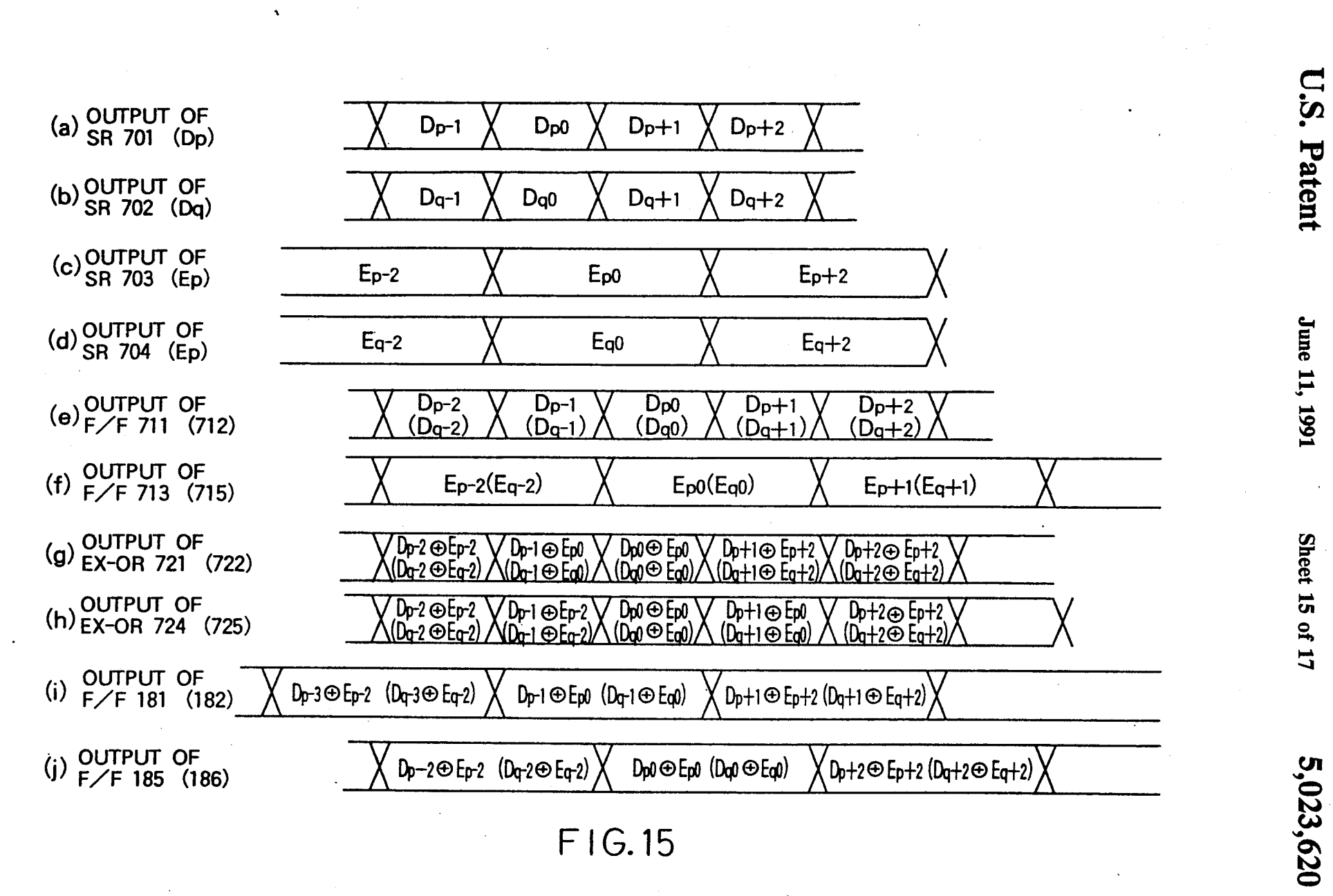

Referring to FIG. 15 together with FIG. 14, the first, the second, the third, and the fourth shift registers (SR) 701 to 704 produce the output signals which are illustrated in FIGS. 15(a) through (d) and which are identical with those illustrated in FIGS. 7(a) through (d), respectively. Likewise, the first or the second flip-flop 711 or 712 and the third or the fifth flip-flop 713 or 715 produce the output signals identical with those illustrated in FIGS. 7(e) and (f), as shown in FIGS. 15(e) and (f). Consequently, the Exclusive OR and the Exclusive NOR circuits produce correlation signals, as exemplified in FIGS. 15(g) and (h). The correlation signals result from erroneous error signals, such as Ep−1 to Eq+1, like in FIGS. 7(g) and (h), and are therefore not correct.

However, the first through the fourth flip-flop elements 181 to 184 produce the correlation signals in synchronism with the clock pulses CLK while the fifth through the eighth flip-flop elements 185 to 188 produce the other correlation signals in synchronism with the inverted clock pulses. Therefore, the other correlation signals are delayed relative to the correlation signals by a half period of the clock pulses CLK, as exemplified by the output signals of the first flip-flop 181 and the fifth flip-flop 185 in FIGS. 15(i) and (j). This shows that the correlation signals are successively correctly produced at every half period of the clock pulses CLK with erroneous correlation signals removed and may be referred to as normal correlation signals. Inasmuch as the normal correlation signals are summed up by the adder circuits 741 to 746 and integrated by the integrators 751 to 756, the illustrated control signal generator 34d stably delivers the control signals, such as R−1 to I+1, to the transversal filter 33. Accordingly, it is possible to carry out stable operation in the illustrated system.

Figure 16:
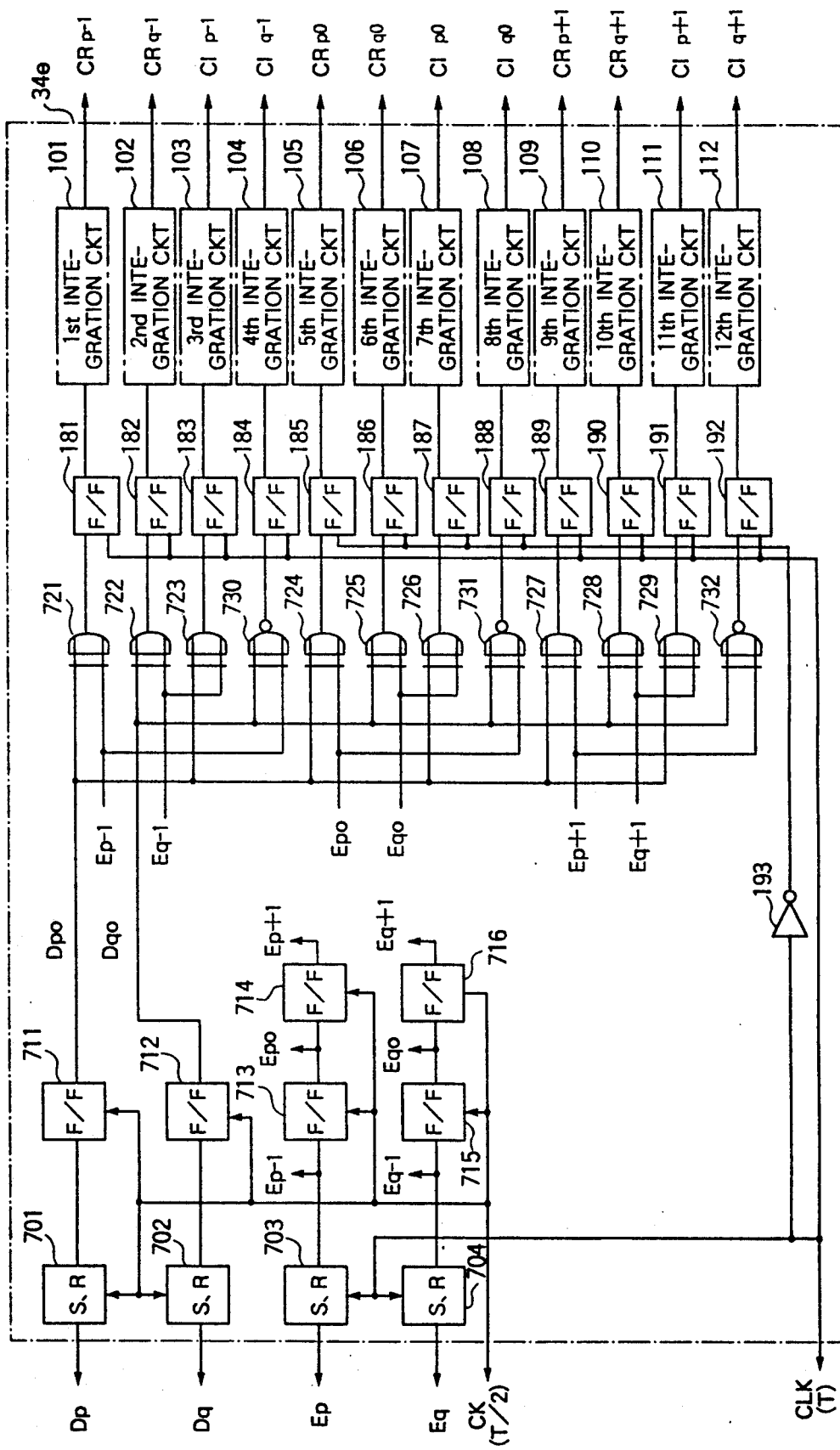
FIG. 16 is a block diagram of a control signal generator available for a cross-polarization interference cancellation system illustrated in FIG. 10.

Referring to FIG. 16, a control signal generator 34e is for use in the interference canceller 30' illustrated in FIG. 10 instead of the control signal generator 34b illustrated in FIG. 11 to form a cross-polarization interference cancellation system. The control signal generator 34e is used for controlling the baseband transversal filters 33 (FIG. 10) and is similar in structure to that illustrated in FIG. 14 except that first through twelfth integration circuits 101 to 112 are substituted for the first through the sixth adder circuits 741 to 746 and the first through the sixth integrators 751 to 756, like in FIG. 11. In other words, the first through the twelfth flip-flop elements 181 to 192 are interposed between the Exclusive OR and the Exclusive NOR circuits 721 to 732 and the first through the twelfth integration circuits 101 to 112 and are operable in a manner similar to those illustrated in FIG. 14. The remaining parts of the control signal generator 34e are operated in a manner mentioned in conjunction with FIG. 15 and will not therefore be described any longer.

Figure 17:
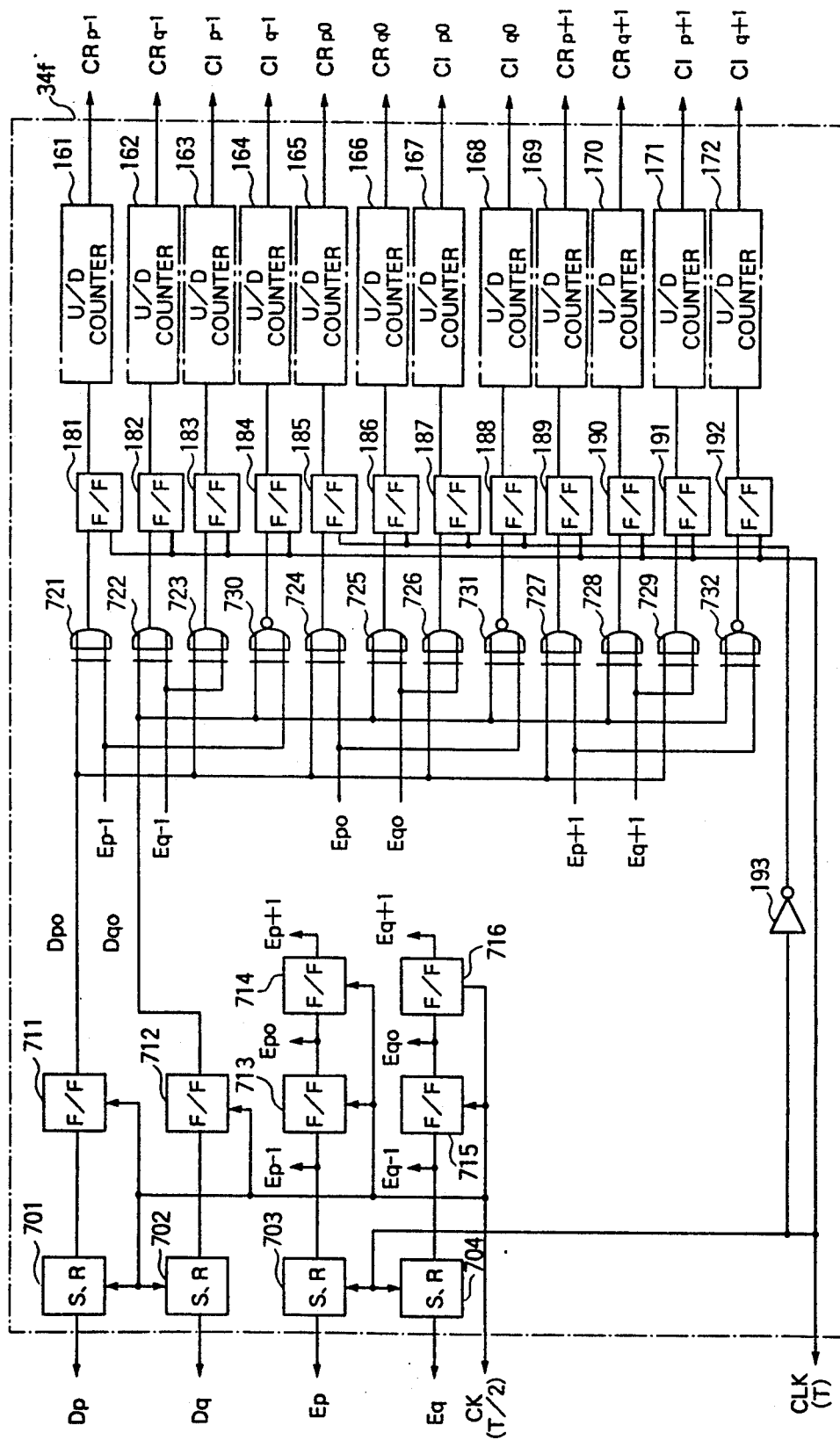
FIG. 17 is a block diagram of a control signal generator for use in operation of the cross-polarization interference cancellation system illustrated in FIG. 12.

Referring to FIG. 17, a digital control signal generator 34f is available for the cross-polarization interference cancellation system illustrated in FIG. 12 and can be substituted for that illustrated in FIG. 13. In the example being illustrated, the digital control signal generator 34f is similar to the control signal generator 34e (FIG. 16) except that first through twelfth up/down counters 161 to 172 are substituted for the first through the twelfth integration circuits 101 to 112 illustrated in FIG. 16. Therefore, it is possible to readily understand operation of the digital control signal generator 34f.

While this invention has thus far been described in conjunction with nine embodiments thereof, it will readily be possible for those skilled in the art to put this invention into practice in various other manners. For example, a wide variety of transversal filters may be substituted for the transversal filters comprising two delay units.

What is claimed is:

1. A cross-polarization interference cancellation system for use in cancelling a cross-polarization interference which occurs during transmission of first and second polarized waves having planes of polarization orthogonal to each other, said cross-polarization interference cancellation system being supplied with first and second input signals which result from said first and said second polarized waves, respectively, and comprising an interference cancellation circuit supplied with said first and said second input signals for cancelling the cross-polarization interference included in said first and said second input signals to produce first and second interference free signals, respectively, and a demodulating circuit coupled to said interference cancelling circuit for demodulating said first and said second interference free signals into first and second demodulated signals together with first and second sets of error signals and first and second sets of quadrant detection signals, respectively, said first and said second sets of the quadrant detection signals being representative of quadrants of said first and said second demodulated signals, respectively, when said first and said second demodulated signals are represented on a phase plane, said demodulating circuit comprising:

first and second coherent detecting means supplied with said first and said second interference free signals for carrying out coherent detection of said first and said second interference free signals to produce first and second sets of detected signals, respectively;

first and second clock production means for producing first and second clock signals each of which has a clock frequency;

first and second analog/digital converter means supplied with said first and said second sets of the detected signals and with said first and said second clock signals for converting said first and said second sets of the detected signals into first and second detected digital signals, respectively;

first frequency doubler means supplied with a selected one of said first and said second clock signals for doubling the clock frequency of said selected one of the first and the second clock signals to produce a first specific clock signal having twice the clock frequency of said selected one of the first and the second clock signals;

second frequency doubler means supplied with a remaining one of the first and the second clock signals for doubling the clock frequency of the remaining one of the first and the second clock signals to produce a second specific clock signal having twice the clock frequency of the remaining one of the first and the second clock signals;

first quadrant detection means for detecting the quadrant of a selected one of said first and said second sets of detected signals in response to a selected one of the first and the second specific clock signals and said selected one of the first and the second sets of said detected signals; and second quadrant detection means for detecting the quadrant of a remaining one of said first and said second sets of detected signals in response to a remaining one of the first and the second specific clock signals and said remaining one of the first and the second sets of said detected signals.

2. A cross-polarization interference cancellation system as claimed in claim 1, wherein said first frequency doubler means is supplied as the selected one of said first and said second clock signals with said second clock signal from said second clock production means while said second frequency doubler means is supplied as the remaining one of the first and the second clock signals with said first clock signal from said first clock production means.

3. A cross-polarization interference cancellation system as claimed in claim 2, wherein said first quadrant detection means is supplied as the selected one of the first and the second specific clock signals with said first specific clock signal and supplied as the selected one of the first and the second sets of the detected signals with the first set of the detected signals while the second quadrant detection means is supplied as the remaining one of the first and the second specific clock signals with said second specific clock signal and supplied as the remaining one of the first and the second sets of the detected signals with the second set of the detected signals.

4. A cross-polarization interference cancellation system as claimed in claim 1, wherein said first frequency doubler is supplied as the selected one of the first and the second clock signals with said first clock signal while the second frequency doubler is supplied as the remaining one of the first and the second clock signals with said second clock signal.

5. A cross-polarization interference cancellation system as claimed in claim 4, wherein said first quadrant detection means is supplied as the selected one of the first and the second sets of the detected signal with the second set of the detected signals while said second quadrant detection means is supplied as the remaining one of the first and the second sets of the detected signals with the second set of the detected signals.

6. A cross-polarization interference cancellation system for use in cancelling a cross-polarization interference which occurs on reception of first and second polarized waves having planes of polarization orthogonal to each other, said cross-polarization interference cancellation system being supplied with first and second input signals which result from said first and said second polarized waves, respectively, and comprising first and second interference cancellers supplied with said first and said second input signals for cancelling the cross-polarization interference included in said first and said second input signals to produce first and second interference free signals, respectively, and first and second demodulator units coupled to said first and said second interference cancellers for demodulating said first and said second interference free signals into first and second demodulated signals together with first and second sets of error signals and first and second sets of quadrant detection signals, respectively, said first and said second sets of the quadrant detection signals being representative of quadrants of said first and said second demodulated signals, respectively, when said first and said second demodulated signals are represented on a phase plane, each of said demodulator unit comprising:

coherent detecting means supplied with each of said first and said second interference free signals for carrying out coherent detection of each of said first and said second interference free signals to produce first and second sets of detected signals, respectively;

a local coherent detection circuit supplied with a local output signal resulting from the other of each of said first and said second input signal for carrying out coherent detection of said local output signal to produce an additional detected signals of said local output signal;

clock production means for producing a sequence of clock signals each of which has a clock frequency;

a frequency doubler supplied with the clock signals from a selected one of a preassigned and the other demodulator units for doubling the clock frequency to produce a sequence of specific clock signals having twice the clock frequency; and quadrant detection means supplied with said additional detection signal and said specific clock signal for detecting the quadrant of said additional detected signal.

7. A cross-polarization interference cancellation system as claimed in claim 6, wherein said frequency doubler is supplied with said clock signals from the other demodulator unit.

8. A cross-polarization interference cancellation system as claimed in claim 6, wherein said frequency doubler is supplied with said clock signals from the preassigned demodulator unit.

9. A cross-polarization interference cancellation system as claimed in claim 1, said interference cancellation circuit being supplied with a selected one of said first and said second input signals as a desired signal and with a remaining one of said first and said second input signals as an interference source signal, each of said first and said second clock signals having a predetermined duty ratio which is determined by a high level duration and a low level duration, said interference cancellation circuit comprising:

a transversal filter circuit of a fractional spacing type responsive to said interference source signal, weighting signals, and said specific clock signals for delaying said interference source signal at every one of said specific clock signals to successively produce delayed interference source signals; and control signal producing means responsive to a selected set of said quadrant detection signals and a selected set of said error signals for supplying control signals as said weighting signals to said transversal filter;

said control signal producing means comprising:

time adjusting means supplied with said selected set of the quadrant detection signals and said selected set of the error signals for adjusting a time difference between said selected set of the quadrant detection signals and said selected set of the error signals to produce adjusted quadrant signals and adjusted error signals;

gate means supplied with said adjusted error signals and said clock signals for inhibiting each of said adjusted error signals within the low level duration of each clock signal to produce gated error signals;

delay means for delaying said adjusted quadrant signals and said gated error signals to produce delayed quadrant signals and delayed error signals both of which have delay times determined in relation to said transversal filter circuit; and processing means for processing said delayed quadrant signals and said delayed error signals into said control signals.

10. A cross-polarization interference cancellation system as claimed in claim 9, wherein said processing means comprises:

logical operation means supplied with said delayed quadrant signals and said delayed error signals for carrying out logical operations between said delayed quadrant signals and said delayed error signals to calculate correlations therebetween and to produce correlation signals representative of said correlations; and output interface means for rendering said correlation signals into said control signals.

11. A cross-polarization interference cancellation system as claimed in claim 6, each of said first and said second interference cancellers being supplied with a selected one of said first and said second input signals as a desired signal and with a remaining one of said first and said second input signals as an interference source signal, each of said first and said second clock signals having a predetermined duty ratio which is determined by a high level duration and a low level duration, each of said first and said second interference cancellers comprising:

a transversal filter circuit of a fractional spacing type responsive to said interference source signal, weighting signals, and said specific clock signals for delaying said interference source signal at every one of said specific clock signals to successively produce delayed interference source signals; and control signal producing means responsive to a selected set of said quadrant detection signals and a selected set of said error signals for supplying control signals as said weighting signals to said transversal filter;

said control signal producing means comprising:

time adjusting means supplied with said selected set of the quadrant detection signals and said selected set of the error signals for adjusting a time difference between said selected set of the quadrant detection signals and said selected set of the error signals to produce adjusted quadrant signals and adjusted error signals;

gate means supplied with said adjusted error signals and said clock signals for inhibiting each of said adjusted error signals within the low level duration of each clock signal to produce gated error signals;

delay means for delaying said adjusted quadrant signals and said gated error signals to produce delayed quadrant signals and delayed error signals both of which have delay times determined in relation to said transversal filter circuit; and processing means for processing said delayed quadrant signals and said delayed error signals into said control signals.

12. A cross-polarization interference cancellation system as claimed in claim 1, said interference cancellation circuit being supplied with a selected one of said first and said second input signals as a desired signal and with a remaining one of said first and said second input signals as an interference source signal, each of said first and said second clock signals having a predetermined duty ratio which is determined by a high level duration and a low level duration, said interference cancellation circuit comprising:

a transversal filter circuit of a fractional spacing type responsive to said interference source signal, weighting signals, and said specific clock signals for delaying said interference source signal at every one of said specific clock signals to successively produce delayed interference source signals; and control signal producing means responsive to a selected set of said quadrant detection signals and a selected set of said error signals for supplying control signals as said weighting signals to said transversal filter;

said control signal producing means comprising:

time adjusting means supplied with said selected set of the quadrant detection signals and said selected set of the error signals for adjusting a time difference between said selected set of the quadrant detection signals and said selected set of the error signals to produce adjusted quadrant signals and adjusted error signals;

first flip-flop means for delaying said adjusted quadrant signals and said adjusted error signals to produce delayed quadrant signals and delayed error signals;

logical calculation means for carrying out logical calculations between said delayed quadrant signals and said delayed error signals to detect correlations therebetween and to produce correlation signals representative of said correlations;

second flip-flop means for retiming said correlation signals by the use of retiming clock signals which result from said clock signals and which have a clock period equal to said desired signal to produce retimed correlation signals; and average means for averaging said retimed correlation signals into said control signals.

13. A cross-polarization interference cancellation system as claimed in claim 6, each of said first and said second interference cancellers being supplied with a selected one of said first and said second input signals as a desired signal and with a remaining one of said first and said second input signals as an interference source signal, each of said first and said second clock signals having a predetermined duty ratio which is determined by a high level duration and a low level duration, each of said first and said second interference cancellers comprising:

a transversal filter circuit of a fractional spacing type responsive to said interference source signal, weighting signals, and said specific clock signals for delaying said interference source signal at every one of said specific clock signals to successively produce delayed interference source signals; and control signal producing means responsive to a selected set of said quadrant detection signals and a selected set of said error signals for supplying control signals as said weighting signals to said transversal filter;

said control signal producing means comprising:

time adjusting means supplied with said selected set of the quadrant detection signals and said selected set of the error signals for adjusting a time difference between said selected set of the quadrant detection signals and said selected set of the error signals to produce adjusted quadrant signals and adjusted error signals;

first flip-flop means for delaying said adjusted quadrant signals and said adjusted error signals to produce delayed quadrant signals and delayed error signals;

logical calculation means for carrying out logical calculations between said delayed quadrant signals and said delayed error signals to detect correlations therebetween and to produce correlation signals representative of said correlations;

second flip-flop means for retiming said correlation signals by the use of retiming clock signals which result from said clock signals and which have a clock period equal to said desired signal to produce retimed correlation signals; and average means for averaging said retimed correlation signals into said control signals.

14. A cross-polarization interference cancellation system for use in cancelling a cross-polarization interference which occurs during transmission of first and second polarized waves having planes of polarization orthogonal to each other, said cross-polarization interference cancellation system being supplied with first and second input signals which result from said first and said second polarized waves, respectively, and which are specified by a quadrant when represented on a phase plane, said cross-polarization interference cancellation system comprising:

first and second frequency converter means for frequency converting said first and said second input signals into first and second frequency converted signals;

a transversal filter of a fractional spacing type supplied with said second frequency converted signal for producing an interference signal representative of said cross-interference;

a clock pulse generator producing a sequence of clock pulses having a clock period;

a frequency doubler for doubling a clock frequency of said clock pulses into specific clock pulses having twice the clock frequency;

means connected to said transversal filter and supplied with said specific clock pulses for detecting a quadrant detection signal representative of the quadrant of said second input signal in accordance with said specific clock pulses; and removing means for removing said interference signal from said first converted signal to produce a demodulated signal including no interference signal.

* * * * *